US008927086B2

(12) United States Patent
Davies et al.

(10) Patent No.: US 8,927,086 B2
(45) Date of Patent: *Jan. 6, 2015

(54) METHOD OF MAKING A REINFORCING MAT FOR A PULTRUDED PART

(75) Inventors: Laurence W. Davies, Winnipeg (CA); Peter J. Fritz, Pella, IA (US); Kenneth D. Beer, Vandergrift, PA (US)

(73) Assignee: Pella Corporation, Pella, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/217,834

(22) Filed: Aug. 25, 2011

(65) Prior Publication Data

US 2012/0108135 A1    May 3, 2012

Related U.S. Application Data

(60) Continuation of application No. 11/852,765, filed on Sep. 10, 2007, now Pat. No. 8,025,754, which is a (Continued)

(51) Int. Cl.
*B32B 5/12* (2006.01)
*D04H 1/74* (2006.01)

(Continued)

(52) U.S. Cl.
CPC .............. *D04H 1/593* (2013.01); *B29C 70/081* (2013.01); *B29C 70/083* (2013.01); *B29C 70/22* (2013.01); *B29C 70/24* (2013.01); *B29C 70/502* (2013.01); *B29C 70/506* (2013.01); *B29C 70/52* (2013.01); *B29C 70/521* (2013.01); *B29C 70/525* (2013.01); *D04H 3/04* (2013.01); *D04H 3/102* (2013.01); *D04H 3/12* (2013.01); *D04H 3/14* (2013.01); *B32B 5/28* (2013.01); *D04H 1/4218* (2013.01); *D04H 1/465* (2013.01)

USPC ............ 428/114; 442/366; 442/367; 442/381

(58) Field of Classification Search
CPC .............. B32B 5/10; B32B 5/12; B32B 5/26; B32B 5/28; D04H 5/02; D04H 5/12; D04H 13/008; D10B 2401/063
USPC ........................... 442/366, 367, 381; 428/114
See application file for complete search history.

(56) References Cited

U.S. PATENT DOCUMENTS 3,692,335 A    9/1972    Vickers et al.
3,761,345 A    9/1973    Smith (Continued)

FOREIGN PATENT DOCUMENTS

EP    0434846 B2    9/1995
EP    0902148 A2    3/1999

(Continued)

OTHER PUBLICATIONS

European Communication issued in EP 00954150, mailed Oct. 30, 2006, 3 pages.

(Continued)

*Primary Examiner* — Jeremy R Pierce
(74) *Attorney, Agent, or Firm* — Faegre Baker Daniels LLP

(57) ABSTRACT

A method of preparing a reinforcing structure for use in manufacture a pultruded part where the reinforcing structure is pulled through a pultrusion die in a continuous longitudinal pull direction. The method includes arranging a plurality of first reinforcing fibers in a transverse direction and attaching a permeable transport web of staple fibers to the first reinforcing fibers such that the portion of the first reinforcing fibers oriented in the direction transverse comprises at least 30% of a volume of materials comprising the reinforcing structure.

36 Claims, 15 Drawing Sheets

Related U.S. Application Data division of application No. 11/063,281, filed on Feb. 22, 2005, now Pat. No. 7,276,132, which is a continuation of application No. 10/015,093, filed on Dec. 11, 2011, now Pat. No. 6,881,288, and a continuation of application No. 10/015,092, filed on Dec. 11, 2001, now Pat. No. 6,872,273, and a continuation of application No. 10/015,126, filed on Dec. 11, 2001, now abandoned, and a continuation of application No. 10/015,106, filed on Dec. 11, 2001, now abandoned, said application No. 10/015,093 is a continuation-in-part of application No. 09/597,453, filed on Jun. 20, 2000, now abandoned, said application No. 10/015,092 is a continuation-in-part of application No. 09/597,453, said application No. 10/015,126 is a continuation-in-part of application No. 09/597,453, said application No. 10/015,106 is a continuation-in-part of application No. 09/597,453.

(60) Provisional application No. 60/155,258, filed on Jun. 21, 1999.

(51) Int. Cl.
| | |
|---|---|
| *D04H 3/05* | (2006.01) |
| *B32B 5/26* | (2006.01) |
| *D04H 1/593* | (2012.01) |
| *B29C 70/08* | (2006.01) |
| *B29C 70/22* | (2006.01) |
| *B29C 70/24* | (2006.01) |
| *B29C 70/50* | (2006.01) |
| *B29C 70/52* | (2006.01) |
| *D04H 3/04* | (2012.01) |
| *D04H 3/10* | (2012.01) |
| *D04H 3/12* | (2006.01) |
| *D04H 3/14* | (2012.01) |
| *B32B 5/28* | (2006.01) |
| *D04H 1/4218* | (2012.01) |
| *D04H 1/46* | (2012.01) |

(56) References Cited

U.S. PATENT DOCUMENTS

| | | | |
|---|---|---|---|
| 3,895,896 A | 7/1975 | White et al. | |
| 3,969,171 A | 7/1976 | Bolen et al. | |
| 4,058,581 A | 11/1977 | Park | |
| 4,265,972 A | 5/1981 | Rudner | |
| 4,278,720 A | 7/1981 | Shannon | |
| 4,334,563 A | 6/1982 | Epel et al. | |
| 4,336,301 A | 6/1982 | Shaw | |
| 4,340,406 A | 7/1982 | Neubauer et al. | |
| 4,421,827 A | 12/1983 | Phillips | |
| 4,477,533 A | 10/1984 | Phillips | |
| 4,479,984 A | 10/1984 | Levy et al. | |
| 4,484,459 A | 11/1984 | Hutson | |
| 4,499,134 A | 2/1985 | Whitely et al. | |
| 4,515,737 A | 5/1985 | Karino et al. | |
| RE31,960 E | 7/1985 | Phillips | |
| 4,550,045 A | 10/1985 | Hutson | |
| 4,556,440 A | 12/1985 | Krueger | |
| 4,564,540 A | 1/1986 | Davies et al. | |
| 4,605,254 A | 8/1986 | Carmien | |
| 4,677,831 A | 7/1987 | Wunner | |
| 4,752,513 A | 6/1988 | Rau et al. | |
| 4,877,470 A | 10/1989 | Krueger | |
| 4,882,114 A | 11/1989 | Radvan et al. | |
| 4,883,552 A | 11/1989 | O'Connor et al. | |
| 4,892,764 A | 1/1990 | Drain et al. | |
| 4,924,631 A | 5/1990 | Davies et al. | |
| 4,935,279 A | 6/1990 | Perko et al. | |
| 4,983,453 A | 1/1991 | Beall | |
| 4,984,402 A | 1/1991 | Davies | |
| 5,047,109 A | 9/1991 | Krueger | |
| 5,055,242 A | 10/1991 | Vane | |
| 5,066,349 A | 11/1991 | Perko et al. | |
| 5,079,054 A | 1/1992 | Davies | |
| 5,175,646 A | 12/1992 | Eden | |
| 5,238,633 A | 8/1993 | Jameson | |
| 5,286,553 A | 2/1994 | Haraguchi et al. | |
| 5,305,601 A | 4/1994 | Drain et al. | |
| 5,308,424 A | 5/1994 | Sasaki et al. | |
| 5,310,600 A | 5/1994 | Tsuya et al. | |
| 5,316,834 A | 5/1994 | Matsuda et al. | |
| 5,319,003 A | 6/1994 | Gomez et al. | |
| 5,322,582 A | 6/1994 | Davies et al. | |
| 5,324,377 A | 6/1994 | Davies | |
| 5,345,974 A | 9/1994 | Bernardi et al. | |
| 5,368,911 A * | 11/1994 | Mannava et al. | 428/167 |
| 5,380,477 A * | 1/1995 | Kent et al. | 264/103 |
| 5,534,302 A | 7/1996 | Ma et al. | |
| 5,585,155 A | 12/1996 | Heikkila et al. | |
| 5,597,629 A | 1/1997 | Johnson | |
| 5,605,757 A | 2/1997 | Klett | |
| 5,612,424 A | 3/1997 | Sato et al. | |
| 5,702,816 A | 12/1997 | Kaiser | |
| 5,713,169 A | 2/1998 | Meier et al. | |
| 5,727,672 A | 3/1998 | Foster | |
| 5,763,042 A | 6/1998 | Kaiser et al. | |
| 5,783,013 A | 7/1998 | Beckman et al. | |
| 5,795,424 A | 8/1998 | Johnson et al. | |
| 5,851,468 A | 12/1998 | Kaiser | |
| 5,860,508 A | 1/1999 | Foster | |
| 5,876,553 A | 3/1999 | Kaiser | |
| 5,883,021 A | 3/1999 | Beer et al. | |
| 5,908,689 A | 6/1999 | Dana et al. | |
| 5,910,458 A | 6/1999 | Beer et al. | |
| 5,931,284 A | 8/1999 | Foster | |
| 6,007,656 A | 12/1999 | Heikkila et al. | |
| 6,011,087 A | 1/2000 | Marshall et al. | |
| 6,013,585 A | 1/2000 | Foster et al. | |
| 6,037,056 A | 3/2000 | Macdonald et al. | |
| 6,048,379 A | 4/2000 | Bray et al. | |
| 6,051,307 A | 4/2000 | kido et al. | |
| 6,080,482 A | 6/2000 | Martin et al. | |
| 6,099,947 A | 8/2000 | Pushpalal et al. | |
| 6,106,944 A | 8/2000 | Heikkila et al. | |
| 6,159,589 A | 12/2000 | Isenberg et al. | |
| 6,179,945 B1 | 1/2001 | Greenwood et al. | |
| 6,268,047 B1 | 7/2001 | Mulder et al. | |
| 6,270,851 B1 | 8/2001 | Lee et al. | |
| 6,287,209 B1 | 9/2001 | Nakajima et al. | |
| 6,495,091 B1 | 12/2002 | Manson et al. | |
| 6,591,567 B2 | 7/2003 | Hota et al. | |
| 6,746,747 B2 | 6/2004 | Davies et al. | |
| 6,872,273 B2 | 3/2005 | Davies et al. | |
| 6,881,288 B2 | 4/2005 | Davies et al. | |
| 7,276,132 B2 | 10/2007 | Davies et al. | |
| 8,025,754 B2 | 9/2011 | Davies et al. | |
| 2002/0121720 A1 | 9/2002 | Davies et al. | |
| 2002/0123287 A1 | 9/2002 | Davies et al. | |
| 2002/0123288 A1 | 9/2002 | Davies et al. | |
| 2003/0003265 A1 | 1/2003 | Davies et al. | |
| 2003/0026943 A1 | 2/2003 | Davies et al. | |
| 2004/0211134 A1 | 10/2004 | Glover et al. | |
| 2013/1037325 | 5/2013 | Davies et al. | |

FOREIGN PATENT DOCUMENTS

| | | |
|---|---|---|
| EP | 1081325 A2 | 3/2001 |
| EP | 1302602 A1 | 4/2003 |
| EP | 2246496 A1 | 11/2010 |
| NL | 9100188 A | 9/1992 |
| WO | WO9829242 A1 | 7/1998 |
| WO | WO9853978 A1 | 12/1998 |
| WO | WO0078529 A1 | 12/2000 |

OTHER PUBLICATIONS

European Search Report issued in EP 00954150, mailed Mar. 12, 2004, 3 pages.

(56) References Cited

OTHER PUBLICATIONS

Gauchel et al., "Pultrusion Processing of Phenolic Resins"48th Annual Conference, Composites Institute, SPI, vol. 48, Feb. 8-11, pp. 2B:1-4, 1993.

International Preliminary Examination Report issued in PCT/US00/40246, completed Sep. 5, 2001, 21 pages.

International Preliminary Examination Report issued in PCT/US02/32019, mailed Feb. 12, 2004, 6 pages.

International Search Report issued in PCT/US00/40246, mailed Sep. 19, 2000, 1 page.

International Search Report issued in PCT/US02/32019, mailed Jan. 13, 2003, 7 pages.

Minutes of Oral Proceedings filed in EP Application No. 00954150, dated Oct. 26, 2012, 7 pages.

Office Action issued in U.S. Appl. No. 10/015,106, mailed Jul. 12, 2005.

Office Action issued in U.S. Appl. No. 10/015,126, mailed Jul. 12, 2005.

Reply to Summons to Attend Oral Proceedings, filed in EP Application No. 00954150, dated Sep. 6, 2012, 21 pages.

Response filed May 9, 2007 to European Communication issued Oct. 30, 2006 in EP Application No. 00954150, 20 pages.

Summons to Attend Oral Proceedings Pursuant to Rule 115(1) EPC, with preliminary opinion, issued in EP Application No. 00954150, dated Apr. 12, 2012, 5 pages.

Written Opinion issued in PCT/US02/32019, mailed Jul. 9, 2003, 2 pages.

Written Opinion issued in PCT/US02/32019, mailed Nov. 19, 2003, 5 pages.

International Search Report and Written Opinion issued in PCT/US2012/069223, mailed Apr. 5, 2013, 15 pages.

International Search Report and Written Opinion issued in PCT/US2012/069810, mailed Mar. 26, 2013, 7 pages.

\* cited by examiner

METHOD OF MAKING A REINFORCING MAT FOR A PULTRUDED PART

CROSS-REFERENCE TO RELATED APPLICATIONS

The present application is a continuation of U.S. application Ser. No. 11/852,765, entitled METHOD OF MAKING A REINFORCING MAT FOR A PULTRUDED PART, filed Sep. 10, 2007 and issued as U.S. Pat. No. 8,025,754, which is a divisional of U.S. application Ser. No. 11/063,281, entitled METHOD OF MAKING A REINFORCING MAT FOR A PULTRUDED PART, filed Feb. 22, 2005 (U.S. Pat. No. 7,276,132), which is a continuation of U.S. application Ser. No. 10/015,093, entitled METHOD OF MAKING A REINFORCING MAT FOR A PULTRUDED PART, filed Dec. 11, 2001 (U.S. Pat. No. 6,881,288), and U.S. application Ser. No. 10/015,092, entitled METHOD OF MAKING A PULTRUDED PART WITH A REINFORCING MAT, filed Dec. 11, 2001 (U.S. Pat. No. 6,872,273), and U.S. application Ser. No. 10/015,126, entitled PULTRUDED PART WITH A REINFORCING MAT, filed Dec. 11, 2001 (Abandonded), and U.S. application Ser. No. 10/015,106, entitled REINFORCING MAT FOR A PULTRUDED PART, filed Dec. 11, 2001 (Abandoned), all of which are continuations-in-part of U.S. application Ser. No 09/597,453, entitled PULTRUDED PART AND METHOD OF PREPARING A REINFORCING MAT FOR THE PART, filed Jun. 20, 2000 (Abandoned), which claims priority of U.S. Provisional application Ser. No 60/155,258 filed Jun. 21, 1999 (Expired), all of which are incorporated herein by reference.

FIELD OF THE INVENTION

The present invention relates to a method of making the reinforcing mat for molded articles.

BACKGROUND OF THE INVENTION

Pultrusion is a known technique in which longitudinally continuous fibrous elements, which can include reinforcing fiber and/or a mat, are combined into a resin-based structure. The process generally involves pulling reinforcing fibers and/or reinforcing mats through a bath of thermoset resin and then into a heated forming die. The heat of the die cures the resin as the part is pulled through the die on a continuous basis.

The mat and reinforcing fiber are typically flexible and conformable textile products since they need to conform to the profile of the die. The mat and reinforcing fiber are typically glass products, while the resin matrix is usually, but not necessarily, a thermosetting polyester. Mat material is generally in the form of a non-woven, felt-like web having glass fibers randomly placed in a planar swirl pattern.

During the pultrusion process, reinforcing fibers typically referred to as rovings comprise groupings of hundreds or thousands of microns-diameter filaments, that mechanically behave like flexible rope. The filaments are flexible because the diameter of each filament is so small. The flexibility of the individual filaments imparts sufficient flexibility to the reinforcing fibers to fulfill the processing requirements of pultrusion. In a pultrusion profile, the mat and rovings constitute the reinforcement, while the resin constitutes the binder of the solid composite. After pultrusion, the rovings are held together by the cured or semi-cured resin matrix, providing the pultruded part with rigidity.

The longitudinal strength of pultruded parts is very high since the majority of the fibers are the longitudinally extending reinforcing fibers that are pulled through the die. However, the transverse strength of pultruded parts is generally minimal because conventional mat fibers extend in random directions and only a small proportion of the total fiber component extends in the transverse direction.

Conventional mats also have a number of problems that interfere with the efficiencies of the pultrusion process. First, the mat is relatively expensive. Second, the mat is difficult to form into the required shape for complex parts. The compressed thickness of the mat also represents a lower limit on the thickness of sidewalls, increasing the amount of resin needed for a given part. Lightweight continuous filament or "swirl" mats are easier to shape, but provide minimal strength, and are more prone to ripping at the die entrance due to low wet tensile strength. The choice of mat is, in part, a compromise between the necessity for bending to shape, the required strength of the pultruded part, and the pulling strength of the reinforcing mat.

U.S. Pat. No. 5,055,242 (Vane) reports a reinforcing mat having a plurality of superimposed layers. Each layer consists of a plurality of uni-directional non-woven yarns or threads laid side-by-side. The yarns in at least some of the different layers extend in different directions. The layers of reinforcing material are stitched together by knitting so as to hold the yarns in fixed position relative to one another, The mat disclosed in Vane exhibits strength primarily in the direction of the uni-directional yarns.

U.S. Pat. No. 5,908,689 (Dana et al.) reports a mat adapted to reinforce a thermosetting matrix material, The mat includes a primary, supporting layer having a plurality of randomly oriented essentially continuous glass fiber strands. The primary layer is about 1 to about 20 weight percent of the mat on a total solids basis. A secondary layer is positioned upon and supported by a surface of the primary layer. The secondary layer includes a plurality of glass fiber strands having a mean average length of about 20 to about 125 millimeters. The strands of the primary layer are entangled with the strands of the secondary layer by needling the primary layer and the secondary layer together.

U.S. Pat. No. 5,910,458 (Beer et al.) reports a mat adapted to reinforce a thermosetting matrix material. The mat includes a primary layer of generally parallel, essentially continuous glass fiber strands oriented generally parallel to a longitudinal axis of the mat. The primary layer is about 45 to about 90 weight percent of the mat on a total solids basis. A secondary layer includes a plurality of randomly oriented, generally continuous glass fiber strands. The strands of the primary layer are entangled with the strands of the secondary layer by needling.

U.S. Pat. No. 4,058,581 (Park) reports adding discontinuous fibers to the resin bath. Similarly, U.S. Pat. No. 5,324,377 (Davies) reports mixing cut fibers in the resin bath to form a homogeneous mass of resin and fibers. The continuous fibers, the cut fibers and the resin are then passed through a die and become integrated into a pultruded part.

In order for the reinforcing mat to pass through the die with the longitudinal fibers, it is necessary for the mat to have a sufficient longitudinal strength so that it does not tear as it is pulled through the die. Furthermore, the mat must have a sufficient shear strength so that it does not twist or skew allowing one side edge of the mat to move in advance of the other side edge. If such twisting or skewing occurs, the mat will become distorted in the part and the mat eventually will break down and the part, will be unusable.

BRIEF SUMMARY OF THE INVENTION

The present invention is directed to a method of preparing a reinforcing structure for use in manufacture a pultruded part where the reinforcing structure is pulled through a pultrusion die in a continuous longitudinal pull direction. The method comprises arranging a plurality of first reinforcing fibers in a transverse direction and attaching a permeable transport web of staple fibers to the first reinforcing fibers such that the portion of the first reinforcing fibers oriented in the direction transverse comprises at least 40% of a volume of materials comprising the reinforcing structure.

In one embodiment, the method comprises arranging the plurality of first reinforcing fibers such that the portion of the first reinforcing fibers oriented in the direction transverse to the pull direction comprises at least 50% of the volume of the materials comprising the reinforcing structure. In another embodiment, the first reinforcing fibers are arranged into one or more overlapping layers of first reinforcing fibers. The staple fibers can have a length of about ½ inch to about 4 inches. Alternatively, the staple fibers have a length of about 0.01 inches to about 12 inches.

In one embodiment, the staple fibers comprise a weight of about 60 grams per square meter to about 300 grams per square meter before attachment to the first reinforcing fibers. In another embodiment, the staple fibers comprise a weight of about 10 grams per square meter to about 1200 grams per square meter before attachment to the first reinforcing fibers.

The permeable transport web can optionally comprise heat-fusible fibers. In another embodiment, the permeable transport web comprises at least two different polymeric fibers, each comprising a different glass transition temperature. In one embodiment, the two polymeric fibers comprise a glass transition temperature of about 350° F. and about 270° F., respectively. In another embodiment, the permeable transport web comprise a plurality of first polymeric fibers comprising a first glass transition temperature a plurality of bi-component fiber. The first component comprises the first glass transition temperature and a second component comprises a second glass transition temperature less than the first glass transition temperature. The bi-component fibers optionally comprise a core-sheath configuration.

The reinforcing structure preferably comprises in-plane mechanical and directional stability. The permeable transport web preferably comprises a plurality of fibers at least a portion of which are randomly entangled with the first reinforcing fibers. In another embodiment, the permeable transport web comprises a plurality of fibers at least a portion of which are thermally bonded to the first reinforcing fibers.

In one embodiment, the first reinforcing fibers are spaced apart and attached together by a continuous stitching fiber. The stitching fiber comprises glass fibers, natural fibers, carbon fibers, metal fibers, ceramic fibers, synthetic or polymeric fibers, composite fibers including one or more components of glass, natural materials, metal, ceramic, carbon, and/or synthetics components, or a combination thereof. In another embodiment, a binder attaches the permeable transport web to the first reinforcing fibers. In one embodiment, the binder comprises one or more of a specialized latex binder diluted in a water carrier, a polyvinyl acetate emulsion, or a crosslinking polyvinyl acetate emulsion.

The reinforcing structure includes a plurality of perforations through the permeable transport web and extending between the first reinforcing fibers. In one embodiment, the reinforcing structure comprises a permeability of at least 180 ft$^3$/minute/ft$^2$ as measured according to the procedure of ASTM D737-96 with a pressure differential of about 0.5 inch column of water. In another embodiment, the permeability comprises about 300 ft$^3$/minute/ft$^2$ as measured according to the procedure of ASTM D737-96 with a pressure differential of about 0.5 inch column of water. In yet another embodiment, the reinforcing structure comprises a permeability of more than 350 ft$^3$/minute/ft$^2$ as measured according to the procedure of ASTM D737-96 with a pressure differential of about 0.5 inch column of water.

In one embodiment, the reinforcing structure comprises a circular bending stiffness of at least about 4 Newtons as measured according to the procedure of ASTM D4032-94. In another embodiment, the reinforcing structure comprises a circular bending stiffness in a range of about 4 Newtons to about 15 Newtons as measured according to the procedure of ASTMD4032-94.

In one embodiment, the reinforcing structure comprises a thickness of about 0.004 inches to about 0.020 inches, and typically about 0.010 inches to about 0.012 inches. The reinforcement structure preferably comprises a tensile strength in the transverse direction of about 200 lbs/inch as measured using the procedure of ASTM D76-99. The reinforcement structure comprises a tensile strength in the pull direction of at least 6 lbs/inch as measured using the procedure of ASTM D76-99.

The first reinforcing fibers comprise glass fibers, natural fibers, carbon fibers, metal fibers, ceramic fibers, synthetic or polymeric fibers, composite fibers (including one or more components of glass, natural materials, metal, ceramic, carbon, and/or synthetics components), or a combination thereof. In another embodiment, the first reinforcing fibers comprise at least one polymeric component. The first reinforcing fibers optionally comprise a surface treatment including an organosilane agent. The organosilane agent comprises one or more families of a cationic ammo-functional siiane, Tris (2-methoxyethoxyvinylsilane), or 3-methacryloxypropyltrimethoxysilane.

In one embodiment, the transverse direction comprises a direction about 90°+/−10° relative to the pull direction. In another embodiment, the transverse direction comprises a direction about 90°/−5° relative to the pull direction. In some embodiments, substantially all of the first reinforcing fibers extend continuously across a width of the reinforcing structure. The reinforcing structure can optionally include a plurality of permeable transport webs.

In one embodiment, a plurality of second reinforcing fibers extend at one or more acute angles relative to the pull direction. In this embodiment, the second reinforcing fibers comprise a transport component. In another embodiment, a plurality of second reinforcing fibers extend at a first acute angle relative to the pull direction and a plurality of third reinforcing fibers extend at a second acute angle that is the negative of the first acute angle. A plurality of fourth reinforcing fibers extending in the pull direction can optionally be added. In one embodiment, the first reinforcing fibers are located between the second and third reinforcing fibers.

In another embodiment, the reinforcing structure comprises a plurality of second reinforcing fibers extending at a first acute angle relative to the pull direction, a plurality of third reinforcing fibers extending at a second acute angle that is the negative of the first acute angle, and a plurality of fourth reinforcing fibers extending generally in the pull direction. In one embodiment, the permeable transport web comprises a plurality of fibers at least a portion of which are randomly entangled with one or more of the first, second, third or fourth reinforcing fibers. In another embodiment, the permeable transport web comprises a plurality of fibers at least a portion of which are thermally bonded with one or more of the first, second, third or fourth reinforcing fibers. In yet another embodiment, the first reinforcing fibers are stitched with one or more of the permeable transport web, the second reinforcing fibers, the third reinforcing fibers, and the fourth reinforcing fibers.

In one embodiment, a binder is used to attach the permeable transport web to one or more of the first, second, third or fourth reinforcing fibers. One or more of the first, second, third or fourth reinforcing fibers optionally comprise a polymeric component. The first reinforcing fibers can be located between the second and third reinforcing fibers and the fourth reinforcing fibers. The first, second, third or fourth reinforcing fibers typically comprise discrete layers.

In another embodiment, the method comprises arranging a plurality of first reinforcing fibers generally in a transverse direction; preparing a permeably reinforcing sheet comprising a plurality of first polymeric fibers comprising a first glass transition temperature and a plurality of bi-component fiber wherein a first component comprises the first glass transition temperature and a second component comprises a second glass transition temperature less than the first glass transition temperature; and attaching a permeable transport web to the first reinforcing fibers.

In yet another embodiment, the method comprises arranging a plurality of first reinforcing fibers in a transverse direction relative to the pull direction and thermally bonding a permeably reinforcing sheet to the first reinforcing fibers. The reinforcing structure comprises a permeability of at least 180 $ft^3$/minute/$ft^2$ as measured according to the procedure of ASTM D737-96 with a pressure differential of about 0.5 inch column of water.

In yet another embodiment, the method comprises arranging a plurality of first reinforcing fibers oriented in a transverse direction and attaching a permeable transport web of staple fibers to the first reinforcing fibers such that a ratio of a modulus of elasticity of the reinforcing structure in the transverse direction relative to a modulus of elasticity in the pull direction comprises at least 1.2. In another embodiment, the ratio of the modulus of elasticity of the reinforcing structure in the transverse direction relative to the modulus of elasticity in the pull direction comprises at least 1.5, preferably at least 3 and more preferably at least 5.

In yet another embodiment, the method comprises arranging a plurality of non-overlapping first reinforcing fibers in a transverse direction and attaching a permeable transport web of staple fibers to the first reinforcing fibers such that the portion of the first reinforcing fibers extending in a transverse direction comprises at least 30% of a volume of materials comprising the reinforcing structure.

In yet anther embodiment, the method comprises arranging a plurality of first reinforcing fibers at 45° (+/−15°) relative to the pull direction; arranging a plurality of second reinforcing fibers at −45° (+/−15°) relative to the pull direction; and attaching a permeable transport web of staple fibers attached to the first and second reinforcing fibers such that the first and second reinforcing fibers comprises at least 30% of a volume of materials comprising the reinforcing structure.

In yet another embodiment, the method comprises arranging a plurality of first reinforcing fibers at 60° (+/−15°) relative to the pull direction: arranging a plurality of second reinforcing fibers at −60° (+/−15°) relative to the pull direction; and attaching a permeable transport web of staple fibers attached to the first and second reinforcing fibers such that the first and second reinforcing fibers comprises at least 30% of a volume of materials comprising the reinforcing structure.

In yet another embodiment, the method comprises arranging a plurality of first reinforcing fibers in a transverse direction and attaching a permeable transport web of staple fibers to the first reinforcing fibers such that the portion of the first reinforcing fibers oriented in the direction transverse comprises at least 40% of a volume of materials comprising the reinforcing structure.

In yet another embodiment, the method comprises arranging a plurality of first reinforcing fibers in a transverse direction continuously across a width of the reinforcing structure and attaching a permeable transport web of staple fibers to the first reinforcing fibers.

BRIEF DESCRIPTION OF THE SEVERAL VIEWS OF THE DRAWING

The invention will now be described in conjunction with the accompanying drawings in which.

DETAILED DESCRIPTION OF THE INVENTION

Figure 1:
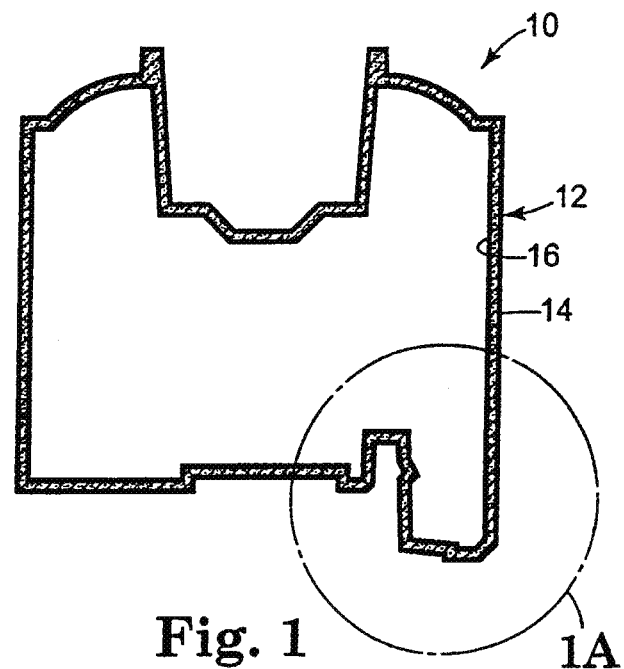
FIG. 1 is a schematic, cross-sectional view of a pultruded part in accordance with the present invention.
Figure 1A:
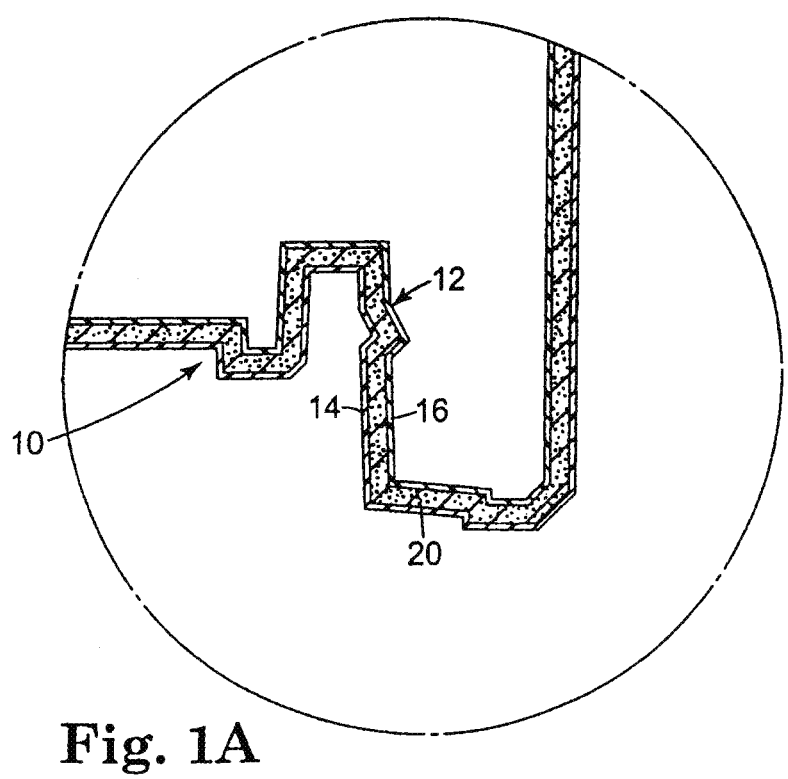
FIG. 1A is an enlarged a portion of the pultruded part shown in FIG. 1.

FIGS. 1 and 1A illustrate a pultruded part, 10 for a fenestration product in accordance with the present invention. The part 10 is shown as a hollow, closed, pultruded body 12 having uniformly spaced outer wall structure 14, an inner wall structure 16 and a resin matrix 20. The reinforcing mat of the present invention is typically located at or near wall structures 14 and 16 to increase transverse strength, although other configurations are possible (see FIG. 2A). In the embodiment of FIGS. 1 and 1A, the pultruded part 10 is a window sash rail, although numerous fenestration and non-fenstration products can be made using the present invention. As used herein, "fenestration products" refers to windows, doors, skylights, shutters, and components thereof, such as for example window jambs, sills, heads, sash stiles, sash rails, door thresholds, and the like.

Figure 2:
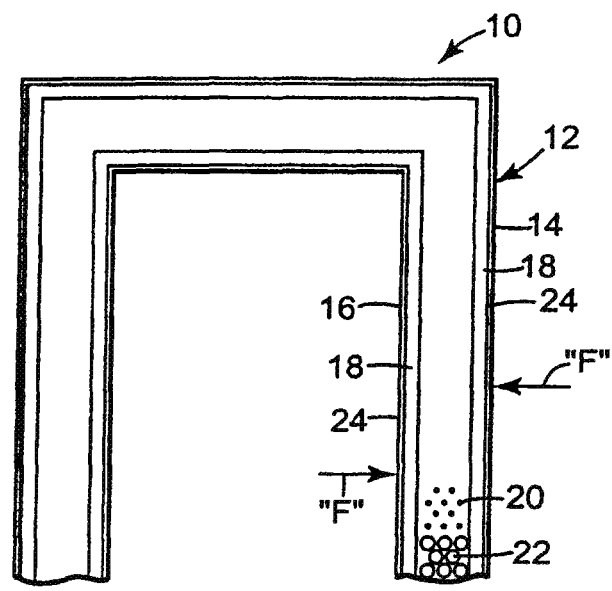
FIG. 2 is a further enlarged schematic detail of the pultruded part shown in FIGS. 1 and 1A.

FIG. 2 illustrates a portion of the pultruded part 10 and a reinforcing mat 18. Pultruded body 12 has wall structures 14 and 16 each including the reinforcing mat 18 located on opposite sides of the resin matrix 20. The resin matrix 20 includes longitudinally extending reinforcing fibers, referred to herein as longitudinal rovings 22. The rovings 22 function to give the pultruded part 10 longitudinal strength and modulus. A reinforcing mat 18 provides the pultrusion walls 14 and 16 transverse strength to resist transverse forces "F" by locating transverse oriented reinforcing fibers in the part. The resin matrix 20 preferably surrounds and impregnates the longitudinal rovings 22 and the reinforcing mat 18. A relatively thin layer 24 of the resin 20 covers the outer face of each of the reinforcement mats 18 to provide the desired surface characteristics. The resin matrix 20 preferably impregnates the reinforcing mat 18.

Figure 2A:
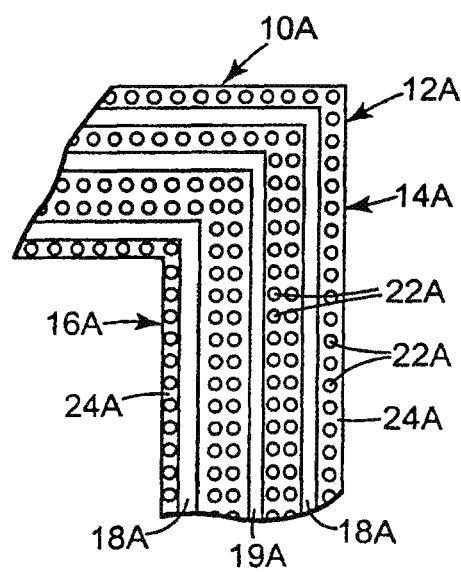
FIG. 2A is a schematic illustration of an alternate pultruded part in accordance with the present invention.

FIG. 2A illustrates an alternate wall structures 14A and 16A for a pultruded part 10A in accordance with the present invention. A reinforcing mat 19A is located near the interior, rather than near the surfaces. In the illustrated embodiment, one or more layers of rovings 22A are positioned on both sides of reinforcing mats 18A and 19A. The pultruded part 10A exhibits alternating layers of reinforcing mats 18A, 19A and rovings 22A. A thin layer 24A of resin forms the surface of the wall structures 14A and 16A.

As illustrated in FIG. 2A, the layers of reinforcing mat and rovings can be arranged in a variety of configurations and the present invention is not limited to locating the reinforcing mat on an outer surface of the pultruded part. The present reinforcing mats 18 or 18A permit the manufacture of pultruded parts with wall thicknesses of about 0.10 inches, and preferably about 0.06 inches and more preferably about 0.03 inches or less.

The resin matrix 20 comprises about 20-40% of the cost of the pultruded part 10. Minimizing wall thickness minimizes resin cost. The thin reinforcing mat 18 with high transverse strength of the present invention permits a reduction in wall thickness without compromising transverse strength.

The present reinforcing mat typically has a compressed thickness of about 0.004 inches to about 0.020 inches. In another embodiment, the reinforcing mat has a compressed thickness of about 0.010 inches to about 0.012 inches. Since the reinforcing mat can be made relatively thin with a low areal density and reinforcing fibers oriented in the transverse direction, the present reinforcing mat can be used to make relatively thin pultruded parts.

In some embodiments, pultruded parts may be manufactured using the thin reinforcing mats of the present invention in which the profile consists of resin impregnated longitudinal rovings or reinforcing fibers totaling a thickness of about 0.019 inches, with a resin impregnated reinforcing mat layer about 0.010 inches thick on each sides of the rovings, for a total wall thickness of about 0.039 inches or less. In another embodiment, the wall thickness is about 0.045 inches to about 0.025 inches. The present reinforcing mat permits about a 33% reduction in wall thickness with the same or greater transverse strength than pultruded parts reinforced with conventional continuous filament mats. Wall thickness of about 0.039 inches using the present reinforcing mats have demonstrated a transverse tensile strengths of about 20,000 psi.

As used herein, "reinforcing fiber" refers to a single filament such as a monofilament, or a grouping of a plurality of pliable, cohesive threadlike filaments, including without limitation glass fibers, natural fibers, carbon fibers, metal fibers (such as for example aluminum), ceramic fibers, synthetic or polymeric fibers, composite fibers (such as a polymeric matrix with a reinforcement of glass, natural materials, metal, ceramic, carbon, and/or synthetics components), or a combination thereof. Although the Figures illustrate the reinforcing fibers schematically as a single entity or structure, each discrete reinforcing fiber illustrated herein can be interpreted as either a single filament, such as a monofilament, or a group of filaments. As used herein, "roving" refers to a plurality of reinforcing fibers. Rovings are typically not twisted or kinked so that maximum longitudinal strength is maintained.

Figure 3:
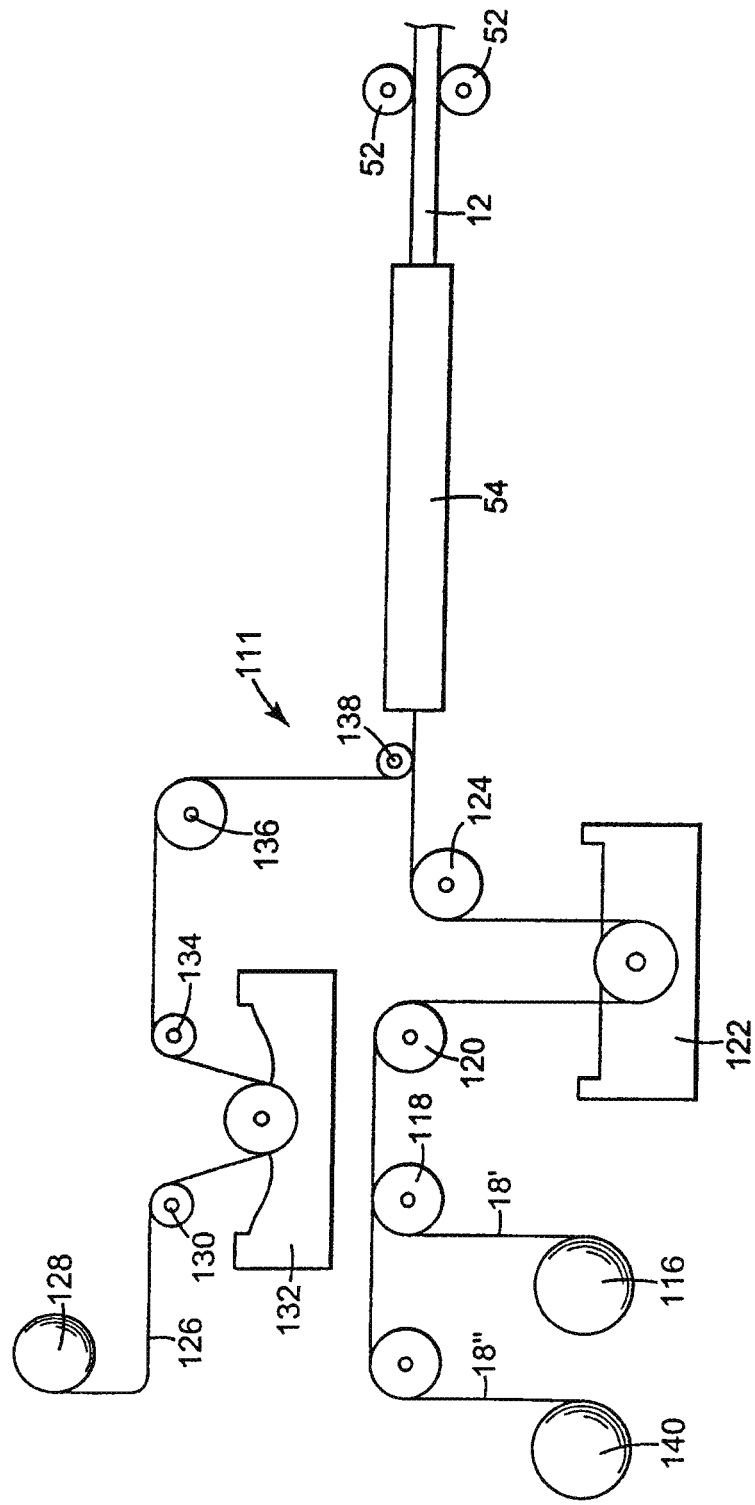
FIG. 3 is a schematic illustration of a pultrusion process and equipment for carrying out a method of the present invention.

FIG. 3 schematically illustrates a pultrusion system 111 suitable for use with a reinforcing mat in accordance with the present invention. One or more reinforcing mats 18', 18" (referred to collectively as "18") are directed from source roils 116, 140, respectively over illustrated rollers 118 and/or 120 to resin bath 122. The wetted reinforcing webs 18 pass over roller 124 into the pultrusion die 54. A plurality of longitudinal rovings 126 from source roll 128 passes over roller 130, through resin bath 132, and then over rollers 134, 136 and 138 into the die 54. The pultrusion die 54 typically has a profile corresponding to or otherwise needed to form the cross-sectional shape of the pultruded part 12. The longitudinal fibers are typically 675-yield (about 675 yards per pound), 450-yield, 250-yield, or 113-yield glass reinforcing fibers, although fibers with other yields or non-glass fibers can be used for some applications.

A variety of techniques well known to one skilled in the art such as carding plates can be used to pre-form or pre-shape the rovings and the reinforcing mats 18 for pulling through the die 54. The reinforcing mats described herein can be used in pultrusion processes using the same techniques as are used for conventional mats. The rovings and the reinforcing mats are collated together for passage through the die but are generally not connected until unified by the setting resin. In another embodiment, the reinforcing mats 18 are attached to some of the longitudinal rovings 126, such as by stitching, adhesives and other attaching techniques. In yet another embodiment, the reinforcing mats 18 can be trapped between layers of rovings, such as illustrated in FIG. 2A. As the longitudinal rovings 126 are pulled through the die 54, the mats 18 are pulled along. The reinforcing mat 18 can be shaped using the same mechanisms used to position the longitudinal rovings 126 relative to the die 54.

Prior to entering the die, the reinforcing mats 18 are preferably shaped to correspond generally with the profile of the die 54. Roll forming analogous to those used in forming sheet metal and/or heat-setting techniques can be used to shape the reinforcing mats 18. Other suitable methods for shaping the mats 18 are disclosed in U.S. Pat. No. 4,752,513 (Rau et al.) and U.S. Pat. No. 5,055,242 (Vane).

Pulling mechanism 52, which for example may comprise a pair of opposing rollers, is operable to pull part 12 from a pultrusion die 54. Instead of passing the longitudinal rovings 126 and the reinforcing mats 18 through respective resin baths 122, 132, as shown schematically in FIG. 3, resin may be applied to die reinforcing fiber and the reinforcing mats 18 using conventional resin-applying procedures that are well known to those skilled in this art. Various techniques for making pultruded parts are disclosed in U.S. Pat. No. 4,564,540 (Davies et al.); U.S. Pat. No. 4,752,513 (Rau et al.); U.S. Pat. No. 5,322,582 (Davies et al); and U.S. Pat. No. 5,324,377 (Davies).

The positioning of the longitudinal rovings 126 and the reinforcing mats 18 relative to the die 54 in FIG. 3 is purely schematic and may change depending upon the desired position of the reinforcing mats 18 and the longitudinal rovings 126. The reinforcing mats 18 and the longitudinal rovings 126 can be located anywhere in a pultruded part. For example, as illustrated in FIG. 2A, alternating layers of reinforcing mats 18A, 19A and longitudinal rovings 126 can be located throughout the pultruded part 12. In some embodiments, the longitudinal rovings 126 may be closest to the surface of the part, rather than the mat.

A conventional pultrusion resin formulation may be used for pultruding part 10. A typical formula may include, for example, a mixture of thermoset polyester resin containing a reactive diluent such as styrene, along with a hardener, a catalyst, inorganic fillers, a suitable surface modifier, and a die lubricant. Suitable resins are disclosed in U.S. Pat. No. 4,752,513 (Rau et al.); U.S. Pat. No. 5,908,689 (Dana et al.); and U.S. Pat. No. 5,910,458 (Beer et al.). A commercially available thermoset resin suitable for use in the present invention is available from Resin Systems Incorporated located in Edmonton, Alberta under the product designation Version G. Other suitable suppliers may include Reichhold, Ashland, and Dow.

Thermosetting matrix materials useful in the present invention can include thermosetting polyesters, vinyl esters, epoxides, phenolics, aminoplasts, thermosetting polyurethanes, derivatives and mixtures thereof. Suitable thermosetting polyesters include the AROPOL products that are commercially available from Ashland Chemical Inc. of Columbus, Ohio. Examples of useful vinyl esters include DERAKANE® products such as DERAKANE® 470-45, which are commercially available from Dow Chemical USA of Midland, Mich. Examples of suitable commercially available epoxides are EPON® 826 and 828 epoxy resins, which are epoxy functional polyglycidyl ethers of bisphenol A prepared from bisphenol-A and epichlorohydrin and are commercially available from Shell Chemical.

Non-limiting examples of suitable phenoiics include phenol-formaldehyde from Monsanto of St. Louis, Mo., cellobond phenolic from Borden of Columbus Ohio, and specific phenolic systems formulated for pultrusion from BP of Chicago Ill., Georgia Pacific of Atlanta Ga., and Inspec (Laporte Performance Chemicals) of Mount Olive N.J. RESIMENE 841 melamine formaldehyde from Monsanto. Useful aminoplasts include urea-formaldehyde and meiamine formaldehyde. Suitable thermosetting polyurethanes include Adiprene® PPDI-based polyurethane supplied by Uniroyal Chemical Company, Inc. of Middle bury, Conn. and polyurethanes that are available from Bayer of Pittsburg, Pa., Huntsman of Edmonton, Alberta, and other resin formulators such as E. I. du Pont de Nemours Co. of Wilmington Del. Other components which can be included with the thermosetting matrix material and reinforcing mat in a pultruded part are, for example, colorants or pigments, lubricants or process aids, ultraviolet light (UV) stabilizers, antioxidants, other fillers, and extenders.

The resin used in producing the pultrusion product can be filled with other materials, either at the longitudinal reinforcing fiber area, at the surface mat areas, or both. Fillers are generally present in amounts ranging from a trace amount to 30 percent, preferably 10 to 25 percent and most preferably 15 percent. The fillers may be any suitable filler utilized by the art to fill a resin system of the type being produced. Fillers and pigments such as calcium carbonate, titanium dioxide, hydrated alumina, kaolin clay, silicon dioxide, carbon black and the like may be used. Wood flour, recycled plastic grinds, metal grinds such as Valimet H2 spherical aluminum powder or Hoeganaes Ancoorsteel 1000 atomized steel powder, fly ash, or the like, can also be used to reinforce or fill the resin of the pultruded part, to obtain improved mechanical properties, to improve aesthetics, to increase or decrease density, or to reduce cost. Wood-fibers may be employed to achieve a natural-wood color in the pultruded product, in addition to the enhanced strength and lowered material cost.

Figure 4:
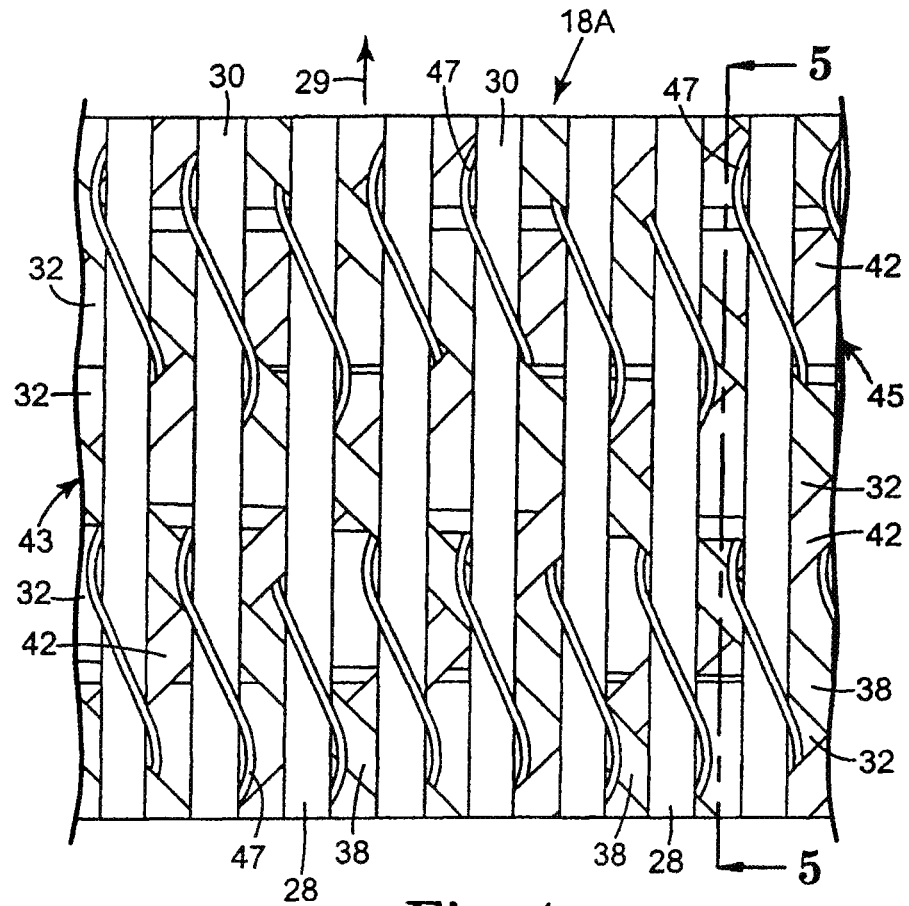
FIG. 4 is a schematic illustration of a bottom view of a reinforcing mat in accordance with the present invention.
Figure 5:
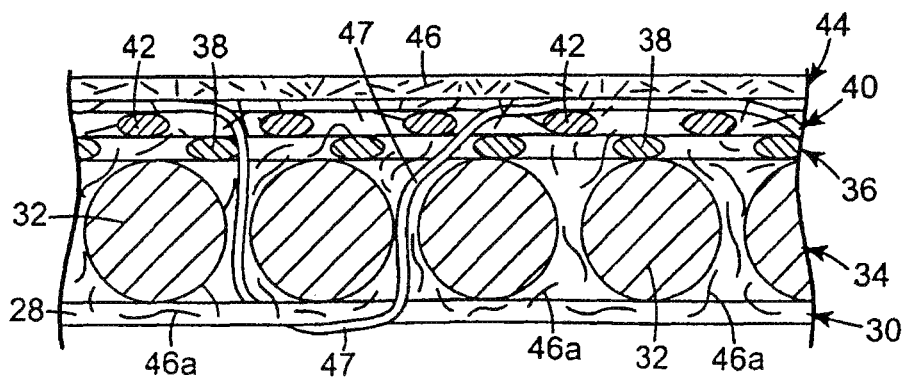
FIG. 5 is a cross-sectional view of the reinforcing mat of FIG. 4.

FIGS. 4 and 5 illustrate one embodiment of a reinforcing mat 18A in accordance with this invention. The reinforcing mat ISA includes a series of separate, transversely spaced, reinforcing fibers 28 (also referred to as transport fibers) comprising a first longitudinal layer 30. In the illustrated embodiment, the first layer 30 is made up of relatively fine reinforcing fibers 28 extending longitudinally in the 0° or pull direction 29 of reinforcing mat 18A. These reinforcing fibers 28 can be oriented in the range of 0° to about +/−20°, and preferably about +/−10°, and more preferably +/−5°. As used herein, the term "layer" refers to the schematic illustration of the various reinforcing fibers in the Figures and is not intended to limit the structure of the present reinforcing mat.

A second set of spaced reinforcing fibers 32 comprising a transverse second layer 34 extend at an angle of about 90° with respect to the pull direction 29. Reinforcing fibers 32 are desirably positioned in substantially directly side-by-side, non-overlapping, slightly spaced relationship to form a blanket of fibers without substantial breaks therebetween. As used herein, "non-overlapping" refers to generally coplanar fibers that do not extend over or cover one another. Each of the reinforcing fibers 32 preferably extend continuously across the width of reinforcing mat 18A from edge portion 43 to edge portion 45. As used herein, "extend continuously" refers to a single strand of reinforcing fiber running in an unbroken segment from one edge of a reinforcing mat to another edge. The 90° orientation of the reinforcing fibers 32 maximizes the transverse strength and increased modulus of the pultruded part 10. In lieu of the preferred 90° orientation, the reinforcing fibers 32 may be positioned at other angularities within the range of about 90°−/−30° and more typically about 90°+/−20° (relative to the 0° or pull direction 29) in the plane of the mat In the illustrated embodiment, the reinforcing fibers 32 have a substantially larger cross-sectional profile than the cross-sectional profile of each of the elongated reinforcing fibers 28, as is evident from the schematic representations of FIGS. 4 and 5. In an embodiment where the transverse reinforcement fibers 32 extending in the 90° direction (+/−30°) are not overlapping (see e.g., FIGS. 4 and 5), they preferably comprise at least 30%, and more preferably at least 40%, of the total volume of material comprising the reinforcing mat 18A. In an embodiment where the first reinforcing fibers 32 are overlapping (see e.g., FIGS. 27 and 28), the reinforcing fibers extending in the 90° direction (+/−30°) direction preferably comprise at least 40%, and more preferably at least 50%, of the total volume of material comprising the reinforcing mat 18A.

As used herein, the pull direction 29 is designated 0°. The orientation of all other reinforcing fibers will be referenced from the pull direction 29. The pull direction 29, however, is independent of the orientation of any particular reinforcing fiber. The reinforcing mat 18 can be oriented in any direction for pulling through the pultrusion die, although some directions are preferred over other. For most applications, however, the larger reinforcing fibers 32 are preferably oriented transverse from the pull direction 29. As used herein, "transverse" refers to a direction generally perpendicular to the 0° or longitudinal pull direction +/−30°, and typically +/−20°, in a plane of a reinforcing mat.

Angular reinforcing fibers 38 comprising an angular reinforcing layer 36 extend at an angle of about 45° with respect to the pull direction 29. In the illustrated embodiment, the reinforcing layer 36 is located adjacent to the layer 34. The reinforcing fibers 38 shown in FIGS. 4 and 5 have a smaller cross-sectional area as compared with the cross-sectional area of transverse reinforcing fibers 32.

Another angular reinforcing layer 40 is located adjacent to the layer 36. The reinforcing fibers 42 are desirably at angle of about 45° with respect to the 0°0 or the pull direction 29. The angularity of reinforcing fibers 38 may be characterized as +45° while the angularity of reinforcing fibers 42 may be characterized as −45° both with respect to the 0° or the pull direction 29. The reinforcing fibers 38 and 42 of angular layers 36 and 40 may be positioned in diagonal directions within the range of about +30° to about +60° and from about −30° to about −60°, respectively. The angular reinforcing fibers 38 and 42 operate, at least in part, as transport fibers that provide longitudinal strength, shear strength and skew resistance. As used herein, "transport fiber" refer to fibers that assist in maintaining the integrity of the reinforcing mat as it is drawn through the pultrusion die.

The reinforcing fibers 38 of layer 36 and reinforcing fibers 40 of layer 42, extending in opposite directions at 45° angles impart shear strength to the reinforcing mat 18A. This increased shear strength is attributable to the fact that reinforcing fibers 38 of layer 36 and reinforcing fibers 42 of layer 40 transmit forces substantially equally in the opposite directions to edge portions 43 and 45 of the mat. By providing such diagonally and oppositely oriented fibers at +45° and −45°, there is minimal tendency for one of the edge portions 43 or 45 to move in advance of the other edge and thus a twisting or skewing the reinforcing mat during pultrusion of part 10. As used herein, "skew" refers to a change in the angular relationship of reinforcing fibers in the plane of a reinforcing mat. Skew typically is exhibited by one side edge of the reinforcing mat moving in advance of the other side edge during pultrusion.

The reinforcing fibers 38 and 42 are preferably continuous and extend across the width of the reinforcing mat so as to maximize transmission of forces in respective diagonal directions. The volume of reinforcing fibers in the layer 36 is preferably about the same as in the layer 40 so that there is a generally uniform resistance to skewing and shear strength stiffness modulus throughout the reinforcing mat 18A. Layer 30, in conjunction with layers 36 and 40, gives the reinforcing mat 18A dimensional stability in the 0° and +/−45° directions so that the reinforcing mat 18A can be bent to make pultruded parts with complex shapes, yet offer sufficient tracking consistency and necking-resistance for consistent processing during pultrusion.

A permeable transport layer 44 is located adjacent to the layer 40, although one or more reinforcing layers 44 can be located between any of the layers 30, 34, 36, 40 of FIG. 5. In the illustrated embodiment, the permeable transport layer 44 comprises a permeable transport web comprising a plurality of relatively short staple fibers or cut fibers 46. The permeable transport layer 44 is preferably made up of randomly oriented staple or cut fibers of a length within the range of about 0.01 to about 12", and preferably in the range of about ½ to about 4". The staple fibers are preferably heat-fusible fibers. As used herein, "permeable transport web" refer to a plurality of staple fibers attachable to various reinforcing fibers in a reinforcing mat to provide longitudinal strength, shear strength and anti-skew properties. Prior to attachment to the reinforcing fibers, the staple fibers can be a collection of loosely associated fibers, a batting material, or a variety of other configurations. As will be discussed in detail below, in some embodiments the permeable transport web operates in combination with other transport components, such as binders, stitching fibers, adhesives, thermal bonding, various methods for entangling the staple fibers with the reinforcing fibers, diagonal reinforcing fibers (also referred to as transport fibers), and the like.

A proportion of fibers 46a are deflected from the plane of the layer 44 to become randomly oriented, intertwined and entangled with the reinforcing fibers 28, 32, 38, 42. The staple fibers or cut fibers 46a effectively mechanically interconnect or attach the layers 30, 34, 36, 40 and 44. The entangling fibers 46a preferably extend substantially through the thickness of reinforcing mat 18A and prevent the layers 30, 34, 36, 40 and 44 from separating or moving one with respect to another as the reinforcing mat 18A is pulled through a pultrusion die 54. The reinforcing layer 44 also maintains the relative position of the respective fibers 28, 32, 38, 42 in the reinforcing mat 18A.

In addition to interconnecting the layers 30, 34, 36, 40 and 44, the layer 44 provides strength and resistance to skew in substantially all directions. Additionally, while the layer 30 provides strength primarily in about the 0° or pull direction 29, the fibers 28 will resist skewing forces at some angles other than 0°. Similarly, the fibers 32 will resist skewing forces at some angles other than 90° and the fibers 38, 42 will resist skewing forces at angles other than +/−45°. It is the combined effect of the reinforcing layer 44 and the various fiber layers 30, 34,36, 40 that provide the present reinforcing mat 18 with the properties that make it suitable for pultrusion.

The contributions of the fibers 28 and 42 in combination with the reinforcing layer 44 provides the reinforcing mat 18A with sufficient in-plane mechanical stability so that thin walled pultruded parts can be made with minimal skewing of the reinforcing mat 18 and minimal shifting of the relative position of fibers 28, 32, 38, 42. For a planar reinforcing structure, the phrase "in-plane mechanical stability" refers to a resistance to deformation and skew in the plane of the article sufficient to use in a pultruded part having a non-planar profile.

In another embodiment, the layers 30, 34, 36, 40 and 44 can be interconnected or attached by stitching with a fiber 47 using a conventional multi-head stitching machine used in the textile industry. It can be seen in FIGS. 4 and 5 that the fiber 47 pass through and interconnect all of the layers 30, 34, 36 and 40 of reinforcing mat 18A. In another embodiment, the layer 44 can also be stitched to the other layers 30, 34, 36 and 40. In yet another embodiment, the first reinforcing fibers 32 can be spaced apart and attached together by continuous fiber stitching 47.

In the embodiment illustrated in FIG. 5, the stitching fiber 47 wraps around some of the reinforcing fibers 32. In embodiments where the reinforcing fibers 32 are groupings of filaments, the stitching fiber 47 can pass between individual filaments in the reinforcing fibers 32 (see e.g., FIG. 20).

The fiber 47 illustrated in FIGS. 4 and 5 are schematic only. By virtue of the flexibility of the individual stitches interconnecting layers 30, 34, 36 and 40, the reinforcing mat remains highly flexible, although mechanically interconnected in a stabilized manner by the fiber 47. The fiber 47 can be polyester thread, a natural fiber thread as for example cotton, or a variety of other known materials.

In another embodiment, the layers 30, 34, 36, 40 and 44 may be interconnected or attached using a variety of other techniques. As used herein, "attach" refers to mechanical and or chemical techniques, including without limitation stitching, entangling strands of staple fibers or cut fibers intimately with the reinforcing fibers, thermal bonding, ultrasonic welding, adhesive bonding, conductive and non-conductive binders, mechanical entanglement, hydraulic entanglement, vacuum compaction, or combinations thereof. Adhesive bonding includes pressure sensitive adhesives, thermosetting or thermoplastic adhesives, radiation cured adhesives, adhesives activated by solvents, and combinations thereof. Binders may also include a thermoplastic resin sheathing on certain or all of the reinforcing fibers, or such resin sheathing may if desired take the place of an added thermoplastic binder. Suitable binders are disclosed in U.S. Pat. No. 4,752,513 (Rau et al); U.S. Pat. No. 5,908,689 (Dana et al); and U.S. Pat. No. 5,910,458 (Beer et al).

The present reinforcing mat 18A has a modulus of elasticity in the transverse or 90° direction that is greater than the modulus of elasticity in the 0° or pull direction. The ratio of the modulus of elasticity in the transverse direction to the modulus of elasticity in the 0° or pull direction is preferably at least 1.2, more preferably 1.5, and still more preferably 3. In some embodiments the ratio is at least 5. As used herein, "modulus of elasticity" refers to a ratio of the increment of some specified form of stress to some specified form of strain, such as Young's modulus, the bulk modulus, or the shear modulus. Modulus of elasticity can also be referred to as the coefficient of elasticity, the elasticity modulus, or the elastic modulus. Modulus of elasticity can be evaluated using ASTM D76-99 (Standard Specification for Tensile testing Machines for Textiles).

The present reinforcing mat can also be used for all other composite processes, and is especially capable of high-strength, due to the oriented fibers, or reduced thickness, to decrease part cost or weight. The reinforcing mat can be used in composite spray-up parts, filament wound parts, resin-transfer-molded, parts, structural-reaction-injection molded parts, sheet-molding-compound parts, vacuum-bag parts, and other composite assemblies, to achieve a thin wall, low cost, low weight, high strength, or the like. The process of using this reinforcing mat would be similar to the current technologies of process, but thinner parts, or multiple-mat thickness parts would be produced, as could be understood by those skilled in these arts.

Figure 6:
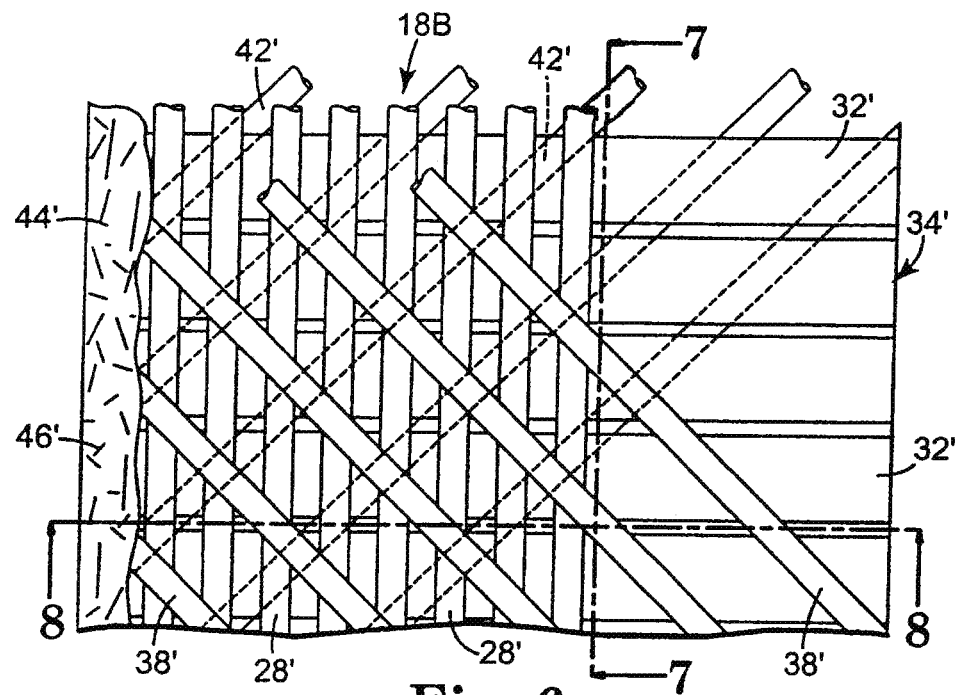
FIG. 6 is a schematic illustration of a top view of an alternate reinforcing mat in accordance with the present invention.
Figure 7:
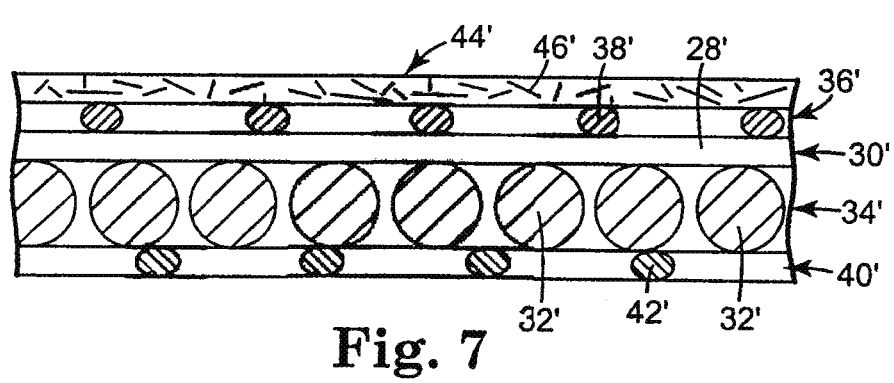
FIG. 7 is a cross-sectional view of the reinforcing mat of FIG. 6.
Figure 8:
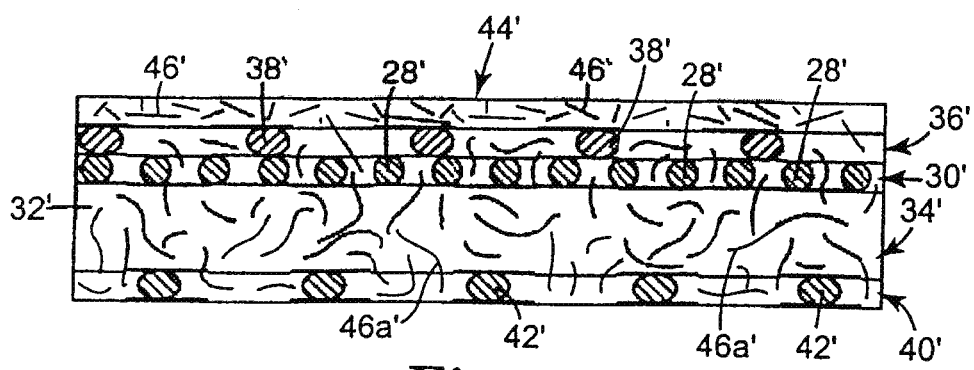
FIG. 8 is another cross-sectional view of the reinforcing mat of FIG. 6.

FIGS. 6-8 illustrate an alternate reinforcing mat 18B in accordance with the present invention, The reinforcing mat 18B has a 0° layer 30' made up of a series of longitudinally extending reinforcing fibers 28'. The layer 30' is adjacent to transverse layer 34' made up of a series of side-by-side reinforcing fibers 32'. Angular fiber layers 36' and 40' made up of reinforcing fibers 38' and 42', respectively, are located on opposite faces of the 0° reinforcing fiber layer 30' and 90° transverse reinforcing fiber layer 34', respectively, as best shown in FIGS. 6 and 7. The diagonally oriented reinforcing fibers 42 and 38 may have an angularity of about +/−45° to angles within the range of about +/−30° to about +/−60°. Permeable transport layer 44' is positioned in overlying relationship to the outer face of angular reinforcing fiber layer 36'. The layer 44' comprises a series of relatively short staple fibers 46' with the entangled connecting fibers being designated by the numeral 46a'.

Figure 11:
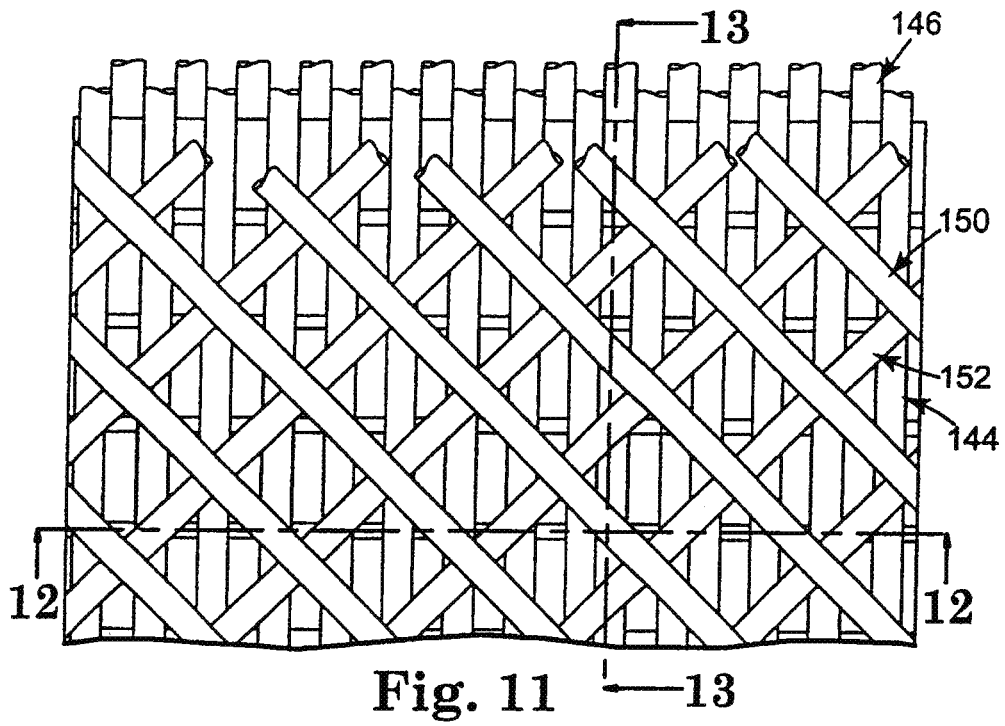
FIG. 11 is a schematic illustration of a top view of a web suitable for making a reinforcing mat in accordance with the present invention.
Figure 12:
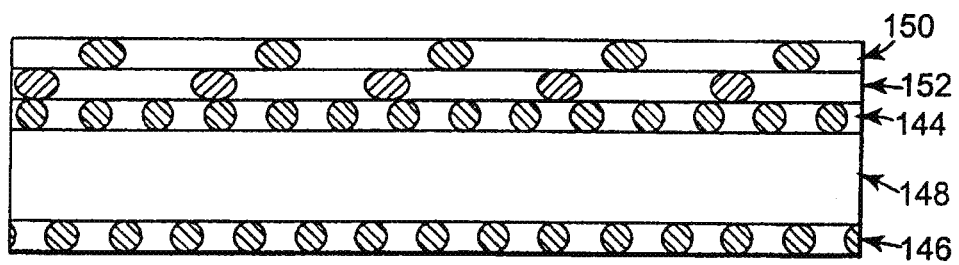
FIG. 12 is a transverse cross-sectional view of the web of FIG. 11.
Figure 13:
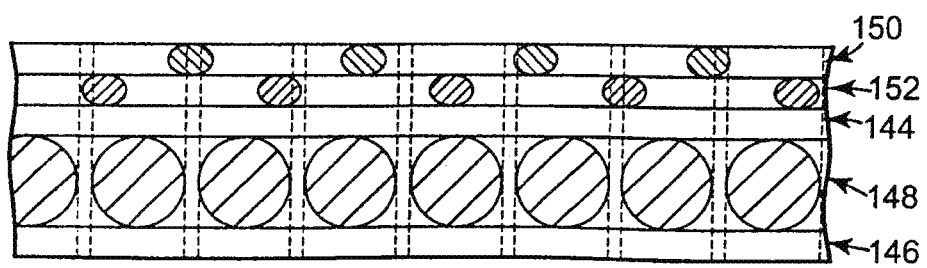
FIG. 13 is a longitudinal cross-sectional view of the web of FIG. 11.
Figure 14:
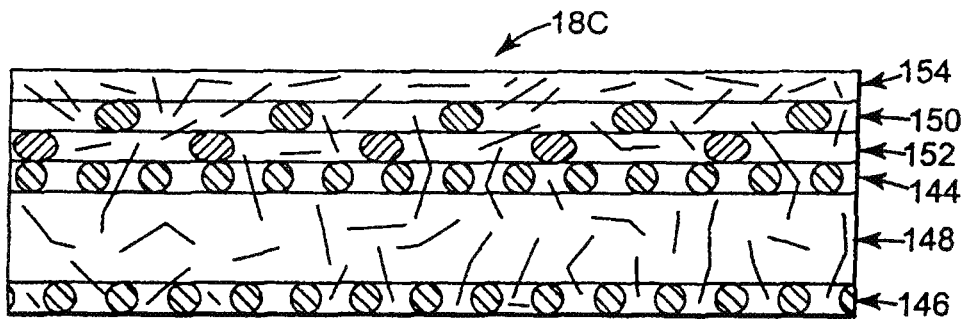
FIG. 14 is another cross-sectional view of the reinforcing mat made from the web of FIG. 11.

FIGS. 11-13 illustrate a precursor web before the addition of a permeable transport layer. Two longitudinally extending reinforcing layers 144 and 146 are provided on opposite sides of centrally located, substantially larger reinforcing fibers in transverse layer 148. Two angular reinforcing layers 150 and 152 are positioned against the face of longitudinal layer 144 opposite transverse layer 148. The angular reinforcing layers 150 and 152 are preferably oriented in opposite diagonal directions at about 45° with respect to the longitudinal length of the mat. FIG. 14 illustrates a reinforcing mat 18C made from the precursor structure of FIG. 13. A permeable transport layer 154 is positioned on top of the diagonal reinforcing fiber layer 150. The relatively short fibers of the permeable transport layer 154 are schematically shown as being entangled with the layers 144, 146, 148, 150, 152.

Figure 15:
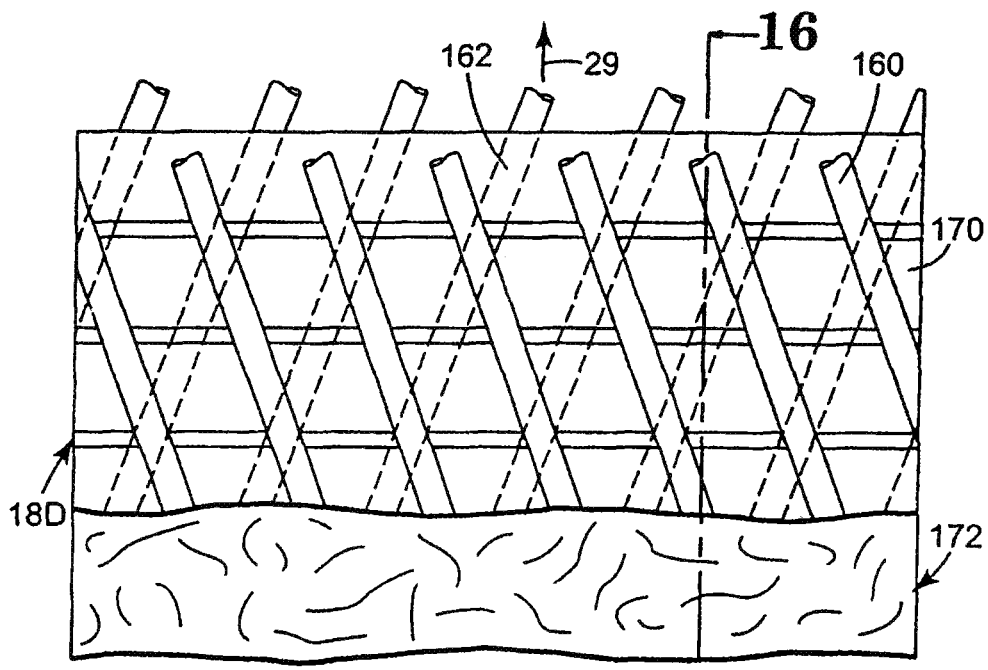
FIG. 15 is a schematic illustration of a top view of an alternate reinforcing mat in accordance with the present invention.
Figure 16:
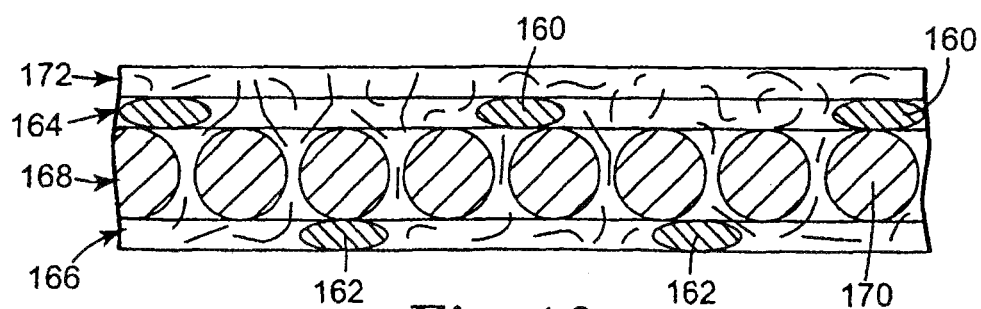
FIG. 16 is a cross-sectional view of the reinforcing mat of FIG. 15.

FIGS. 15-16 illustrate a reinforcing mat 18D in which diagonal reinforcing fibers 160 and 162 are positioned at 70° angles with respect 0° or the pull direction 29. The layers 164 and 166 are located on opposite sides of the layer 168 containing the transverse reinforcing fibers 170. The permeable transport layer 172 interconnects or attaches the layers 164, 166, 168, and 172. The diagonal reinforcing fibers 160, 162 provide adequate dimensional stability in the pull direction 29 so that the 0° reinforcing fibers can be omitted.

Figure 19:
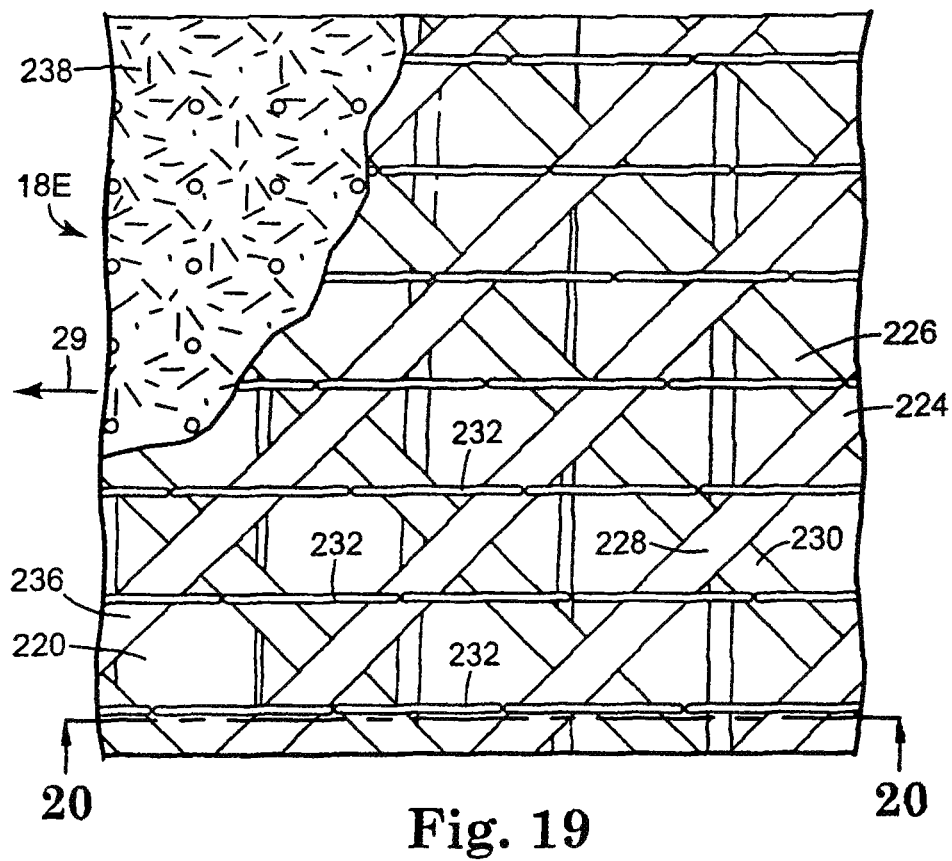
FIG. 19 is a schematic illustration of a top view of an alternate reinforcing mat in accordance with the present invention.
Figure 20:
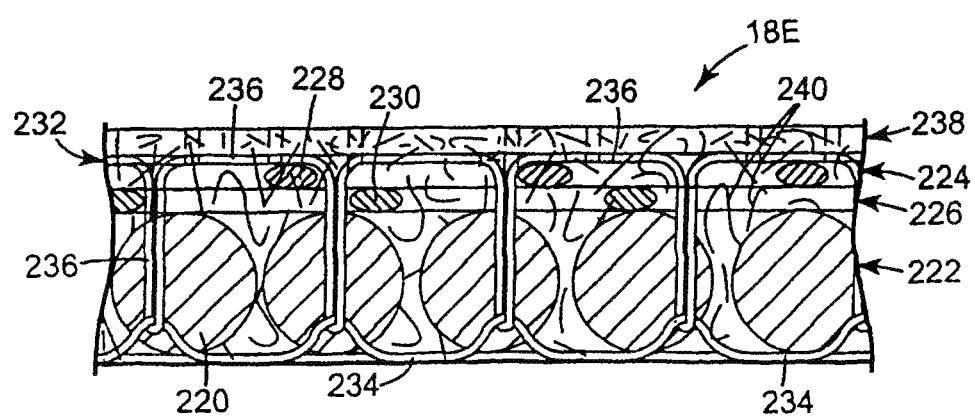
FIG. 20 is a cross-sectional view of the reinforcing mat of FIG. 19.

FIGS. 19-20 illustrate another embodiment of a reinforcing mat 18E in accordance with the present invention. The reinforcing mat 18E includes a series of elongated, separate, essentially parallel, spaced, transverse reinforcing fibers 220 arranged to form a transverse reinforcing layer 222. The reinforcing fibers 220 of reinforcing layer 222 are oriented at an angle of approximately 90° with respect to 0° or the pull direction 29 of a part through the die 54. The reinforcing fibers 220 are laid continuously across with width of the reinforcing mat 18E and lie in a slightly spaced, side-by-side relationship. As previously explained, transversely oriented reinforcing fibers increase the modulus of a pultruded part 10 reinforced with reinforcing mat 18E. Although reinforcing fibers 220 illustrated at 90° in FIG. 19, the reinforcing fibers 220 may be positioned at other angularities within the range from about 60° to about 120° in the plane of the mat. Also as previously indicated, transverse fiber reinforcing fibers 220 normally are present in an amount within the range of about 40% to about 90% of the total volume of material comprising the reinforcing mat 18E.

Mat 18E also has two layers 224, 226 of angled reinforcing fibers 228, 230, respectively. As is most evident from FIG. 19, the reinforcing fibers 228 of layer 224 are at an angle of about +45° with respect to 0° while the reinforcing fibers 230 of layer 226 are at an angle of about −45°. The reinforcing fibers 228, 230 of layers 224, 226 are of a lesser diameter than the diameter of individual transverse reinforcing fibers 220 in order to maintain the as much of the volume of the reinforcing mat 18E in the transverse or 90° direction.

The layers 224, 226, 228 are interconnected or attached by spaced, parallel individual lines of stitching 232. In the embodiment of FIG. 19, the reinforcing fibers 220 are typically groups of filaments through which the stitching 232 can pass. From FIG. 19 it can be seen that the lines of stitching 232 extend in perpendicular relationship to reinforcing fibers 220. Each line of stitching 232 is made up of a relatively straight bobbin thread 234 and a serpentine stitch thread 236. The bobbin thread 234 of each line of stitching 232 generally lays in underlying relationship to the reinforcing fibers 220, while the stitch thread 236 of each line of stitching 232 extends into overlying relationship to the layer 224 of reinforcing mat 18E, thus serving to interconnect layers 222, 224, 226. As used herein, a "stitched thread" is located on a front surface of a reinforcing mat and a "bobbin thread" is located on the opposite side of the mat.

It is also to be observed from FIG. 19 that the upper right segments 236 of adjacent stitch threads 236 are offset from one another in a direction perpendicular to reinforcing fibers 220. The lines of stitching are applied using a multiplicity of adjacent, mutually cooperative, individual stitching heads as previously herein. Although polyester thread is preferred for lines of stitching 232, other common materials may be used such as cotton thread or other natural or synthetic resin fibers, depending upon the pultrusion process, the mechanical properties desired of for example a pultruded fenestration product, or other pultruded part.

A permeable transport layer 238 is provided in overlying relationship to layer 224. The permeable layer 238 is preferably made up of randomly oriented staple fibers. At least a certain proportion of the staple fibers are entangling fibers 240 that randomly extend through at least a part of the composite thickness of reinforcing mat 18 and serve to further interconnect the individual layers 222, 224, 226, 238 of reinforcing mat 18 in conjunction with the lines of stitching 232.

The entangling fibers 240 are preferably hydro-entangled with layers 222, 224, 226 utilizing hydro-entanglement equipment and employing procedures as described herein. The closely spaced heads of the hydro-entangler divert staple fibers from the plane of the layer 238 thereby causing hydro-jet diverted staple fibers to extend randomly in a direction through the thickness of the composite mat 18E. To that end, the staple fibers making up reinforcing mat 18E preferably have a relatively low resistance to bending so that randomly oriented fibers are forced downwardly into and through the layers of the reinforcing mat below using hydro-entangling equipment.

Figure 21:
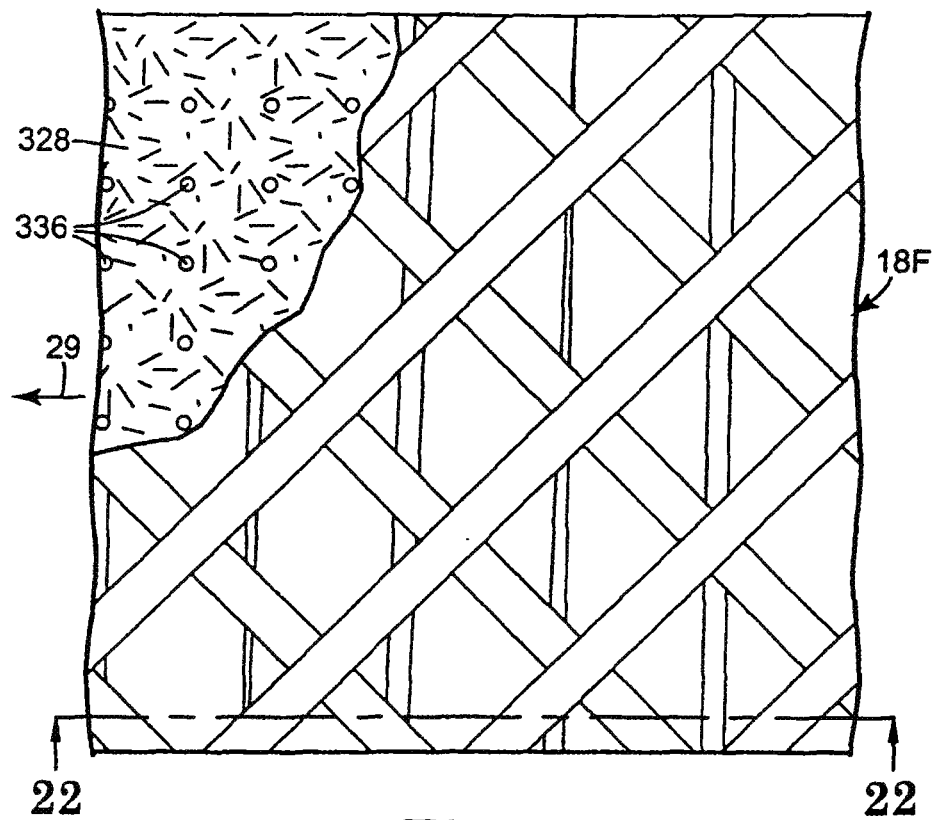
FIG. 21 is a schematic illustration of a top view of an alternate reinforcing mat in accordance with the present invention.
Figure 22:
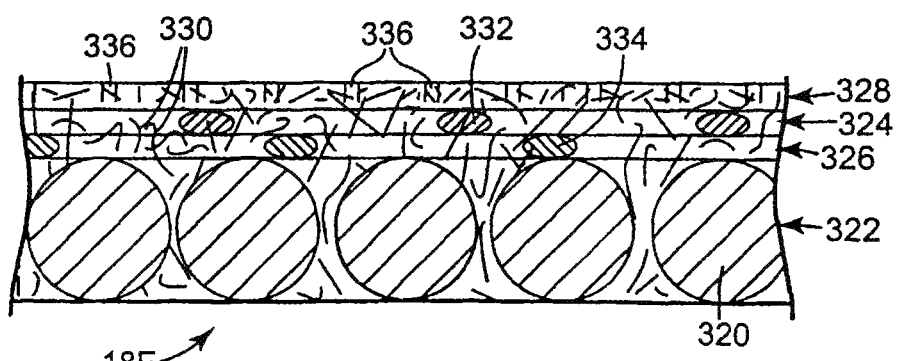
FIG. 22 is a cross-sectional view of the reinforcing mat of FIG. 21.

FIGS. 21 and 22 illustrate an alternate the reinforcing mat 18F similar to that illustrated in FIGS. 19 and 20, except that the layers 322, 324, 326 and 328 are attached without stitching. Transverse reinforcing fibers 320 are arranged at 90° to the pull direction 29. Two angled reinforcing layers 324, 326 of angled reinforcing fibers 332, 334 oriented at about +/−45° are positioned between the layer 322 and the permeable transport layer 328. Fibers 330 from the layer 328 extend throughout the thickness of the reinforcing mat 18F to form a mechanical bond between the layers 322, 324, 326, 328. Supplemental holes 336 are formed in the permeable layer 328 to facilitate wetting of the reinforcing mat 18F with resin during the pultrusion process. Secondary attaching techniques may also be used, such as the addition of binders and/or adhesives, thermal bonding, and the like.

Figure 23:
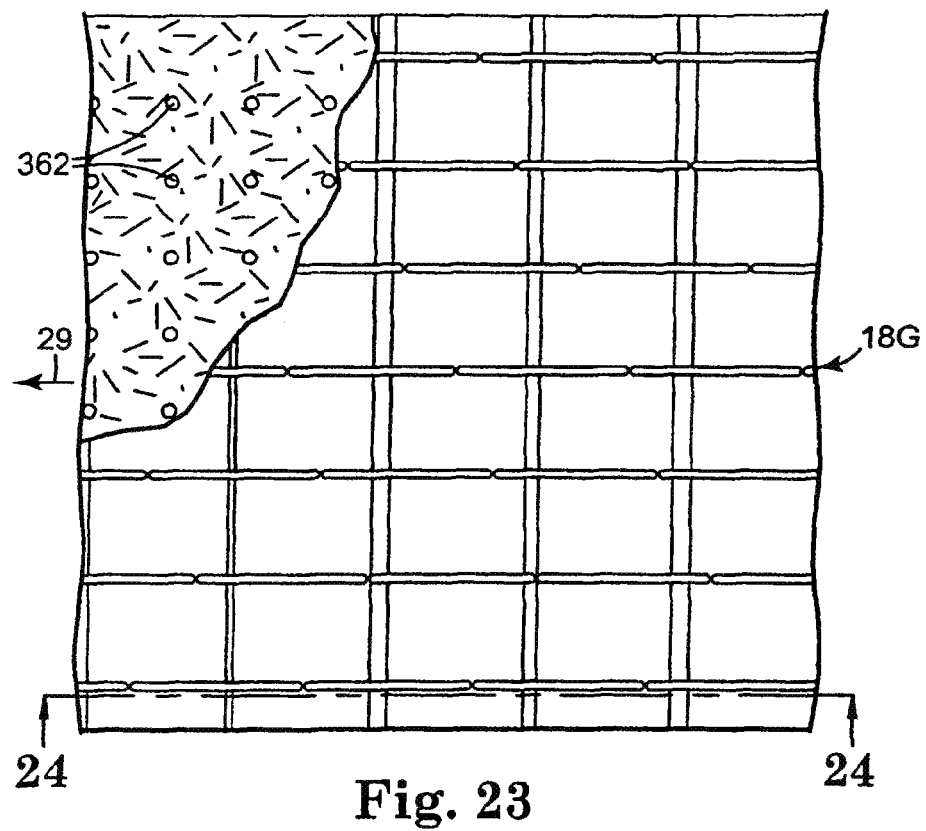
FIG. 23 is a schematic illustration of a top view of an alternate reinforcing mat in accordance with the present invention.
Figure 24:
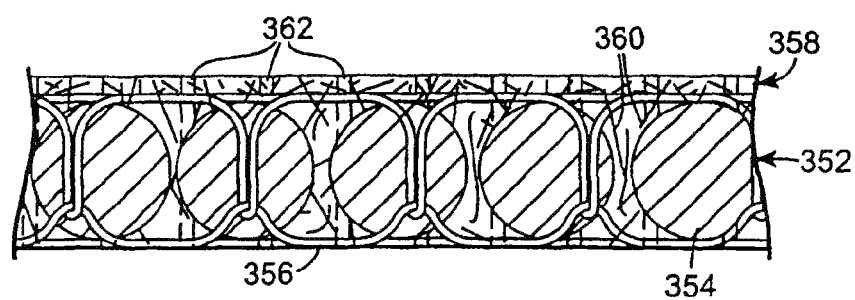
FIG. 24 is a cross-sectional view of the reinforcing mat of FIG. 23.

FIGS. 23 and 24 illustrate an alternate reinforcing mat 18G in which the layer 352 of reinforcing fibers 354 arranged at 90° from the pull direction are stitching 356. The first reinforcing fibers 354 are preferably spaced apart and attached together by continuous fiber stitching 356. The stitching 356 holds the reinforcing fibers 354 in an array during attachment of permeable transport layer 358. The permeable transport layer 358 is provided on at least one side of the layer 352. Staple fibers 360 of layer 358 are entangled with the reinforcing fibers 354 of transverse reinforcement layer 352 to form a reinforcing mat with in-plane mechanical stability. Supplemental holes 362 are formed in the permeable layer 358 to facilitate wetting of the reinforcing mat 18F with resin during the pultrusion process.

In another embodiment, the array of transverse reinforcing fibers 354 and the permeable transport layer 358 are stitched together to form a combined structure. The stitching is preferably applied after hydraulic entanglement and heat fusing of the transverse reinforcing fibers 354 to the permeable transport layer 358.

Figure 25:
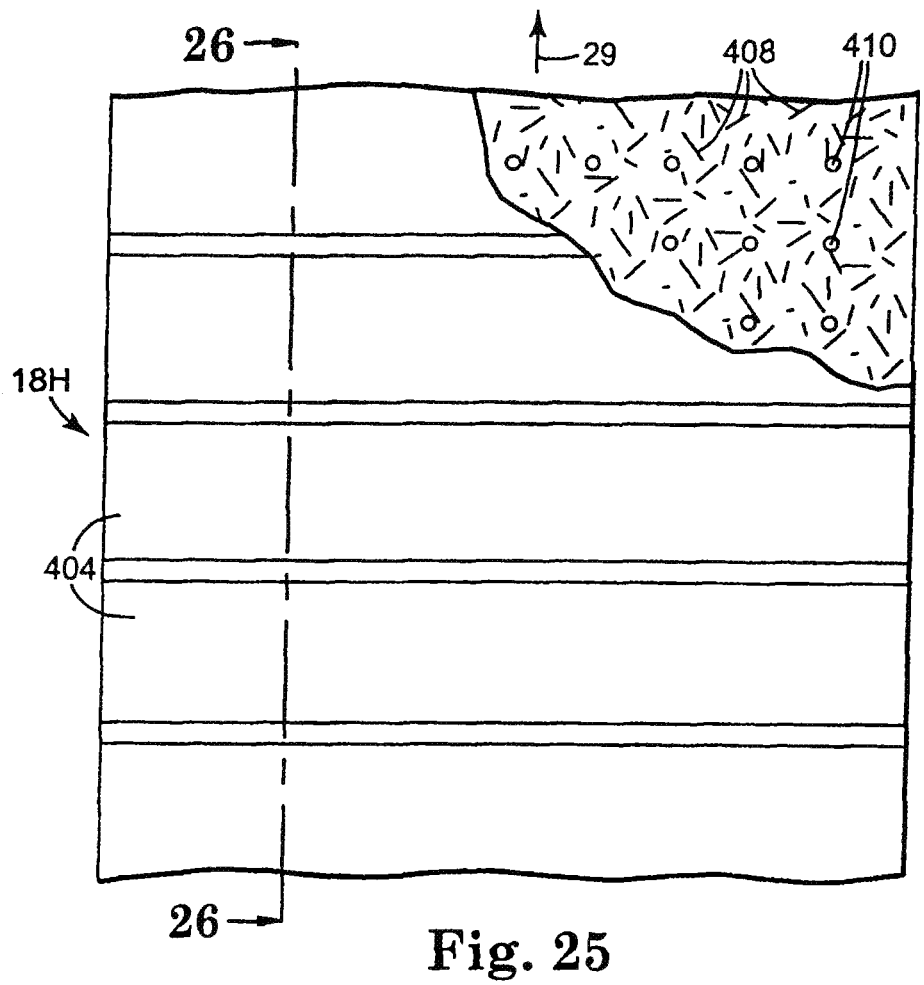
FIG. 25 is a schematic illustration of a top view of an alternate reinforcing mat in accordance with the present invention.
Figure 26:
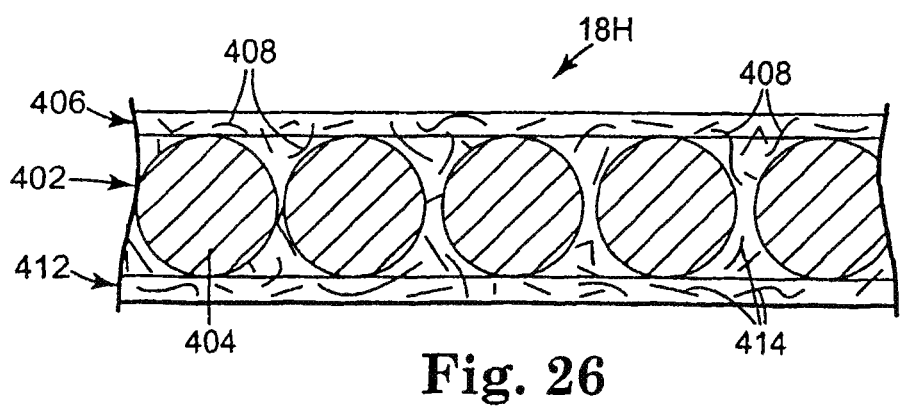
FIG. 26 is a cross-sectional view of the reinforcing mat of FIG. 25.

FIGS. 25 and 26 illustrate an alternate reinforcing mat 18H having a layer 402 of transverse reinforcing fibers 404 arranged at about 90° relative to the pull direction 29. A permeable transport, layer 406 is positioned on one side of the layer 402. Staple fibers 408 of the layer 406 are entangled with the layer 402 to form a reinforcing mat 400 with in-plane mechanical stability. Supplemental holes 410 are formed in the layer 406 to facilitate wetting during pultrusion. In addition to the entangled staple fibers 408, other techniques disclosed herein may also be used to attach the layer 402 to the layer 406, such as thermal or adhesive bonding, binders, stitching and the like. In one embodiment, a second permeable transport layer 412 is optionally located on the other side of the layer 402. Fibers 414 from the layer 412 also entangle with fibers 408 from the layer 406. The second layer 412 reinforces the reinforcing mat 18H, particularly if the layers 406 and 412 are thermally bonded.

Figure 27:
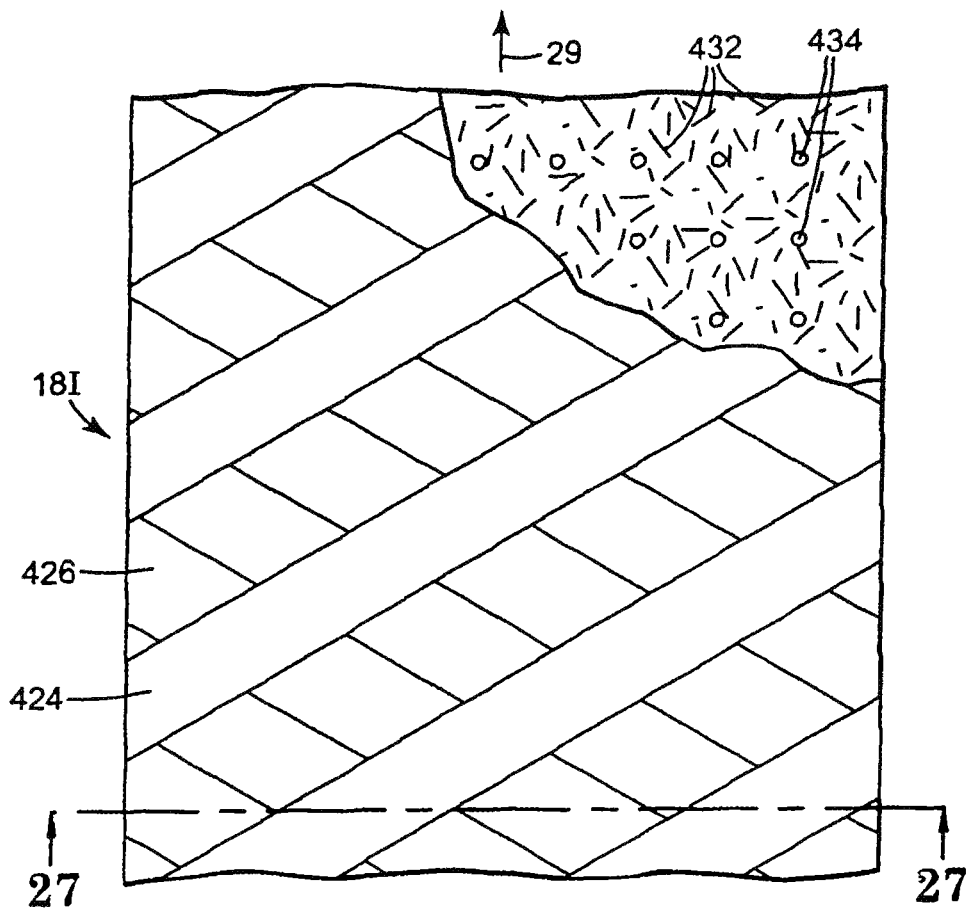
FIG. 27 is a schematic illustration of a top view of an alternate reinforcing mat in accordance with the present invention.
Figure 28:
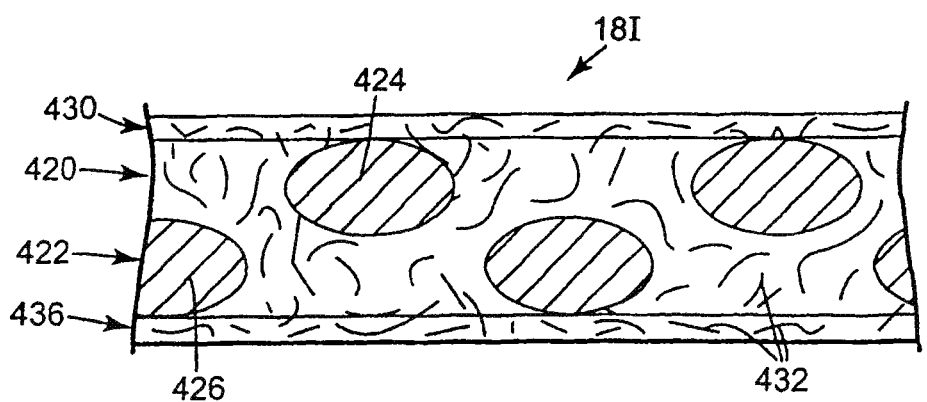
FIG. 28 is a cross-sectional view of the reinforcing mat of FIG. 25.

FIGS. 27 and 28 illustrate an alternate reinforcing mat 18I having two layers 420, 422 of transverse-acting reinforcing fibers 424, 426, respectively. The transverse-acting reinforcing fibers 424, 426 have a substantially larger cross section, corresponding generally to the transverse reinforcing fibers 32 in FIG. 5. In one embodiment, the reinforcing fibers 424 are arranged at about 60° (+/−15°) relative to the pull direction 29. The reinforcing fibers 424 are desirably positioned in substantially directly side-by-side, non-overlapping, slightly spaced relationship. The reinforcing fibers 426 are arranged at about −60° (+/−15°) relative to the pull direction 29, The reinforcing fibers 426 also do not overlap with each other. The layers 420, 422, however, do overlap. As used herein, "overlap" refers to fibers that extend over or cover one another.

In another embodiment, the reinforcing fibers 424, 426 are arranged at 45° and −45° (+/−15°), respectively. While the orientation of the fibers 424, 426 in these two embodiments are outside the definition of "transverse", arranging the reinforcing fibers 424, 426 at opposing angles in these ranges is desirable for some applications. In both embodiments, the reinforcing fibers 424, 426 preferably comprises at least 30% of a volume of materials comprising the reinforcing mat 18I, and more preferably 40%.

A first permeable transport layer 430 is positioned on one side of the layers 420, 422. Staple fibers 432 of the layer 430 are entangled with the layers 420, 422 to form a reinforcing mat 181 with in-plane mechanical stability. Supplemental holes 434 are formed in the layer 430 to facilitate wetting during pultrusion. In one embodiment, a second permeable transport layer 436 is optionally located on the other side of the layers 420, 422. Fibers 432 from the layer 436 also entangle with fibers 424, 426. The second layer 436 reinforces the reinforcing mat 181, particularly if the layers 430, 426 are thermally bonded. In another embodiment, an additional layer of reinforcing fibers is provided in the 0° direction to enhance pulling strength (see FIG. 4).

Method of Making a Reinforcing Mat

Figure 9:
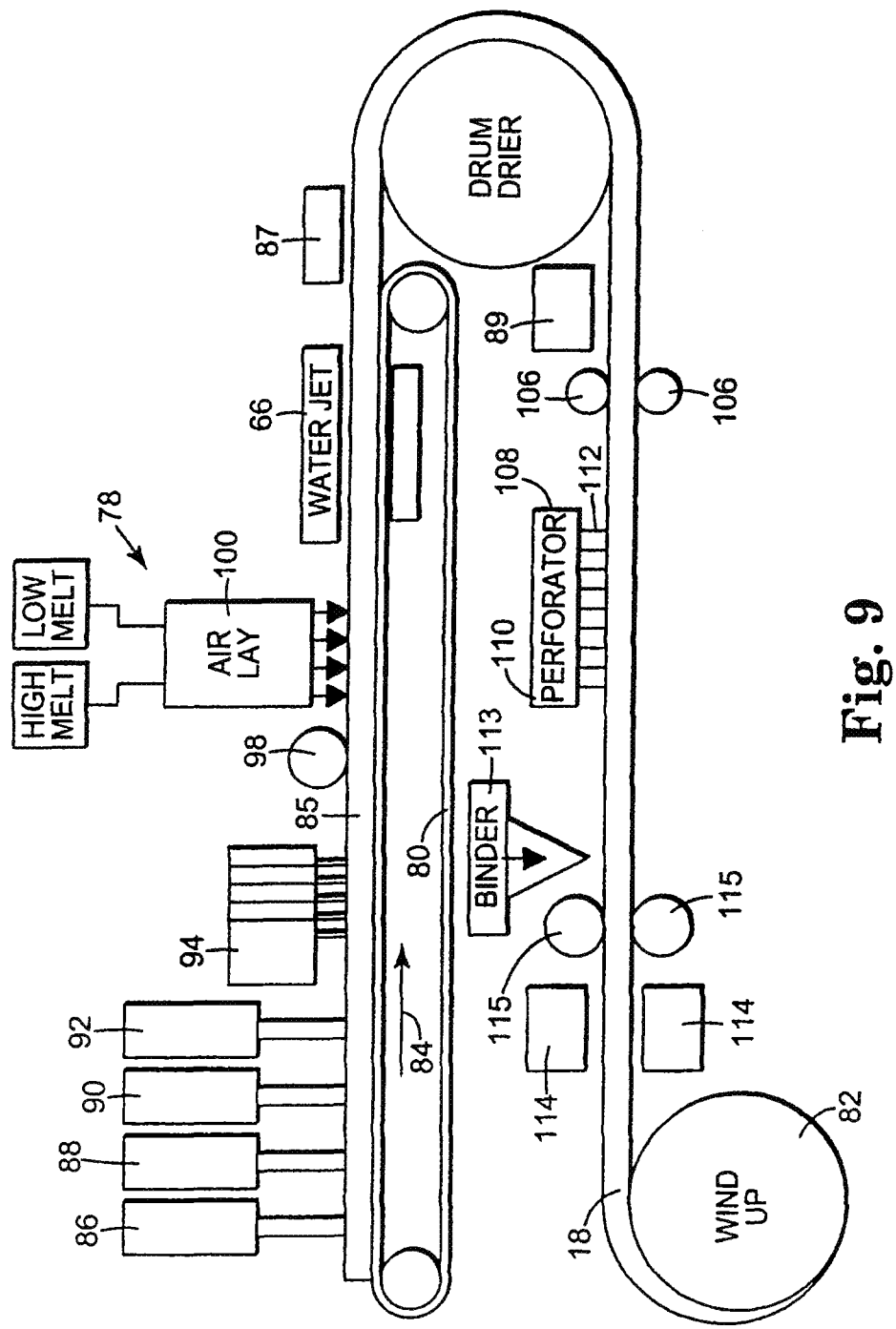
FIG. 9 is a schematic illustration of a method of making a reinforcing mat in accordance with the present invention.

FIG. 9 illustrates an apparatus 78 for making the reinforcing mat 18 in accordance with the present invention. The apparatus 78 includes a conveyor belt 80 arranged to carry the components of the reinforcing mat 18 from an initial supply to a wind-up device 82. The longitudinal length 84 of the belt corresponds to the 0° direction of the reinforcing mat 18 during manufacturing.

A precursor web 85 is made by sequentially laying onto the belt 80 a plurality of reinforcing fibers from supply units 86, 88, 90, and 92. A plurality of needles are preferably located along the edges of the belt 80. Supply head 90 continuously lays down reinforcing fibers along the longitudinal length of belt 80, thus providing a 0° lay of reinforcing fibers. Reinforcing fibers supply head 88 is operable to reciprocate back and forth across the width of belt 80 to lay down 90° transverse reinforcing fibers. The reinforcing fibers are wound around needles along each edge of the endless belt 80 to arrange the reinforcing fibers for the desired orientations.

Angled reinforcing fiber supply head 92 lays down a reinforcing fibers on the previously applied 0° and 90° reinforcing fibers at about a 45° angle. Diagonal reinforcing fiber supply head 86 functions to lay down reinforcing fibers at an angle of about −45° with respect to the longitudinal length 84 of the belt 80. The head 86 traverses back and forth across belt 80 in timed relationship to the speed of the belt 80 to provide angled reinforcing fibers. The angled reinforcing fibers are wound around the needles along each edge of the endless belt 80. Preferred results have been obtained by using 11 courses per inch of 90° reinforcing fiber, about 8 courses per inch of 45° angular reinforcing fibers, and about 8 courses per inch of 0° reinforcing fibers in an assembled web 18.

The present method permits the combination of 0°, 90° and +/−45° reinforcing fibers to be varied. For example, the 0° fibers can be eliminated to make a reinforcing mat similar to that illustrated in FIGS. 15 and 16. In another embodiment, only the 90° reinforcing fibers are applied, such as illustrated in FIGS. 25 and 26. Various methods for depositing the layers of reinforcing fibers are disclosed in U.S. Pat. No. 4,484,459 (Hutson); U.S. Pat No. 4,550,045 (Hutson); U.S. Pat. No. 4,677,831 (Wunner); and U.S. Pat. No. 5,308,424 (Sasaki et al).

In one embodiment, a plurality of stitching heads 94 are provided down stream of the supply units 86, 88, 90, 92. The stitching heads 94 optionally form spaced, parallel lines of stitching in the layers of reinforcing fibers (see e.g., FIG. 20). The stitch thread can be polyester, aramid thread for toughness, natural fibers for cost, polyamides, such as Pegaso Micro Helanfil 2x80 dtex or Honeywell Anso-tex nylon, for resilience, or carbon threads for stiffness or high-temperature capability. A suitable assembly for depositing the layers of reinforcing fibers and stitching the layers together is available from LIBA Maschinenfabrik GmbH of Germany under the trade designation Centra Max 3 CNC fiber inserter.

In another embodiment, the stitching is omitted and the web 85 is passed under a hot roll 98 to assist in bonding of the layers of the web 85 one to another. The use of hot roll 98 is particularly suited when one or more of the reinforcing fibers contain a polymeric component. The roll 98 act also to calender the web 85 so that it is compressed and slightly reduced in thickness. The temperature of the roll 98 is preferably selected to cause the minimal amount of softening of the polymeric content and still achieve an adequate bond between the fibers. The roll 98 may also bond the polymeric components of the reinforcing fibers by imparting ultrasonic energy. In another embodiment, the heat is omitted and a simple calendering action is used.

Non-woven machine 100 deposits polymeric cut-staple fibers onto the web 85. The non-woven machine 100 can be a variety of structures, such as for example an air lay machine or a mechanical card. The staple fibers are the precursor material for making the permeable transport layer discussed herein. The staple fibers are typically blended and carded, and a predetermined thickness is achieved by stacking a plurality of layers of staple-fiber webs or batting onto the web 85.

In one embodiment, the staple fibers comprise a non-woven batting web may be made by blending of polyester staple fibers. The staple fibers preferably include a portion of high melt fibers and a portion of low melt fibers. In another embodiment, the low melt fibers are a bi-component fiber with a high melt portion and a low melt portion. The low melt portion provides a bonding function with the various layers, while the high melt portion minimizes warping and shrinkage of the reinforcing mat 18 and excessive flow of the low melt polymer. A preferred bi-component fiber is a core-sheath configuration with the low melt polymer on the sheath and the high melt polymer at the core. In one embodiment, the high melt fibers have a glass transition temperature of about 350° F. and the low melt fibers have a glass transition temperature of about 270° F.

In another embodiment, the non-woven machine 100 may include spinning needles that convert an open fiber polymeric material into high loft "tufts" of non-woven fibers. The tufts of high loft material are deposited in an accumulator until a target weight is reached, whereupon the tufts are dropped onto the web 85. When more than one type of open fiber polymeric material is used, separate accumulators are used so that the percentage of each type of material can be independently controlled.

In one embodiment, the staple fibers are blended and opened in a non-woven opener sold under the product referred to as a carding machine or garnet wheel sold by Sigma Fiber Controls of Simpsonville, S.C. The staple fibers and/or cut fibers are then fed through a Rando webber so that a density of about 32 gram/meter$^2$ to about 60 gram/meter$^2$ is reached. The Rando feed and doff speeds are set to achieve the desired density. One or more layers of the non-woven batting is then deposited on the web 85.

After the staple fibers are laid onto the web 85, they are entangled with the layers of reinforcing fibers. In the illustrated embodiment, the staple fibers are entangled using a water-jet hydro-entangler 66, such as the structure illustrated in FIG. 10. The hydro-entangler 66 substantially compresses the staple fibers to achieve the overall reinforcing mat thickness of about 0.004 inches to about 0.020 inches. The individual jets of water wet the randomly oriented fibers of the staple fibers directly to the reinforcing fibers and force certain of the fibers into locations extending throughout the reinforcing mat 18.

In some circumstances the water jets from the hydro-entangler unit may break up some of the fibers of the reinforcing fibers to produce shorten tangling fibers randomly oriented in the same manner as entangling staple fibers. These broken reinforcing fibers may extend throughout the cross-section of the web 18. These broken reinforcing fibers cooperate with the staple fibers to maintain the layers in proper relative relationship during processing of reinforcing mat 18 and in the use thereof as a reinforcement for a pultruded part.

Figure 10:
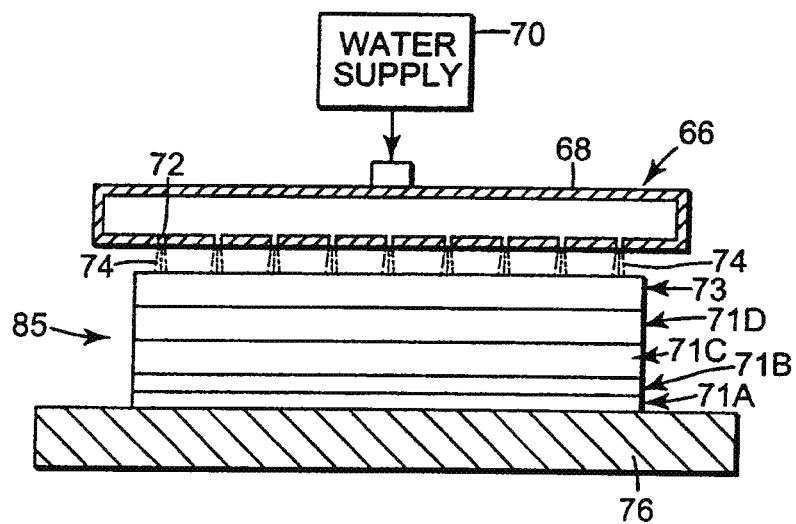
FIG. 10 is a schematic illustration of an entangling device in accordance with the present invention.

Turning now to FIG. 10, the web 85 with multiple layers of reinforcing fibers 71A, 71B, 71C, 71D and the layer of staple fibers 73 is fed into a hydro-entangler 66 on a fine-mesh belt 76. In general, the hydro-entangler 66 has upper manifold structure 68 receiving water from supply source 70 provided with a plurality of openings or nozzles 72 which direct water jets 74 directly onto the web. The water-jets delivered from nozzles 72 are preferably pulsed so that the jet streams exit through respective nozzles 72 and pass through the thickness of the web 85 until impacting the upper surface of a fine mesh belt 76. The water streams impacting against the upper surface of belt 76 cause the water to dissipate and thereby spread the fibers carried by the jet streams transversely across the top of the belt 76 to enhance entanglement of the web 85.

A suitable hydro-entangler is commercially available from ICBT Perfojet of Mont Bonnet, France. The ICBT Perfojet hydro-entangler has three horizontally-spaced manifolds of the type shown schematically in FIG. 10, each having a row of water-jet nozzles 68, with the nozzles spaced at approximately eight per inch, providing a total of 100 to 150 nozzle openings. The water is jetted onto the web 85 with the first manifold set at a water pressure of 500 psig, the second at 1500 psig, and the third at 1500 psig. The web 85 becomes entangled as the water jets from manifold 66 pass through the layered material making up the reinforcing mat 18.

The hydro-entangler has the capability to blow-in holes or enhance existing holes in the web 85 to achieve higher permeability. Permeability is useful to allow resin to flow through the thickness of the reinforcing mat in the pultrusion die, to avoid harmful hydraulics or bubbling of the reinforcing mat at the pultrusion die entrance. When enhanced by hydro-entangling, the hole size and distribution are determined by the hydro-entangler back screen pattern and back screen mesh size.

A mesh size of 24×48 wires/inch in the backside conveyor belt that transports the web 85 through the hydro-entangling process has been used to create an array of holes 24×48 holes/inch$^2$, to increase the permeability. A mesh size of 10×10 wires/inch can also be used for some applications where the coarses mesh allows for larger holes, corresponding to a higher and more desirable permeability. A permeability of 200-400 ft$^3$/minute/ft$^2$ of air, through the web 85 (at a pressure differential of 0.5" of water) is sufficient for the resin to penetrate the reinforcing mat 18 during pultrusion, but a permeability of 600-800 ft$^3$/minute ft$^2$ or higher works very well for subsequent pultrusion processing. In an alternate embodiment, the hole size and distribution is enhanced by a needling operation.

Figure 18:
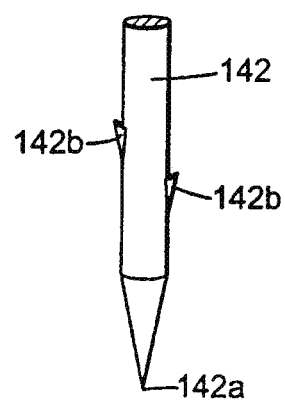
FIG. 18 is an enlarged, fragmentary view of a representative needle useful for entangling staple fibers or cut fibers in a reinforcing mat of the present invention.

In lieu of using a hydro-entangler as described, a head (not illustrated) may be provided which supports a series of barbed needles 142 as shown in FIG. 18. In this case, the layer of staple fibers 73 should be opposite the points 142a of the needles so that when the barbed needle penetrate the mat, the barbs 142b do not engage the fibers of the staple fibers 73. However, upon retraction of the barbed needles 142, the barbs 142b thereon engage certain of the relatively short fibers and pull all at least a portion of such fibers upwardly into the reinforcing fiber layers and to entangle the staple fibers with the reinforcing layers.

Figure 17:
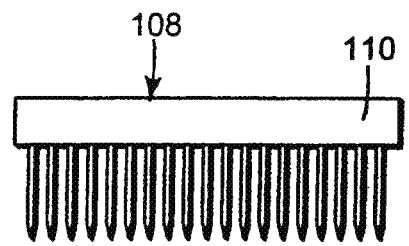
FIG. 17 is an enlarged, fragmentary, schematic representation of a needle apparatus for forming holes through the thickness of a reinforcing mat.

Turning back to FIG. 9, the web 85 can optionally be fed into a needier or perforator 108 that has a head 110 which supports a plurality of parallel, relatively closely-spaced needles 112 (FIG. 17) located downstream of the hot rolls 106. The head 110 is reciprocated to sequentially direct the needles 112 through the reinforcing mat to form an array of perforations. The array includes perforations spaced both longitudinal and transversely so the series of needles across the width of the web 85 are punched through the web 85 as it moves forwardly to provide the required number of spaced perforations. The perforations increase the porous nature of the reinforcing mat 18 and allow penetration of resin to bond through the reinforcing mat into the various components of the mat.

From 1 to about 5000 holes per square inch may be formed in the web using perforator 108, but about 80 holes per square inch formed by #14 needle size is preferred in a rectangular grid pattern. The needier 108 may be of conventional design which functions at a rate of approximately 20 cycles or reciprocations per second. The holes may be round or polygonal and generally are of a diameter what may be characterized as pin holes. The hole pattern may be random, square, rectangular, close-packed-hexagonal, or similar configurations. During needling, the needles can optionally be heated to about 160° F., by use of electric heat guns placed inside the needle box area, and blowing air through the length of the needle board.

The flow of viscous resin (such as polyester resin) through the reinforcing mat during the pultrusion process affects the speed of pultrusion and the quality of the pultruded part. The permeability of the reinforcing mat is particularly important at the die entrance for both a bath style and a resin-injection style of pultrusion.

Permeability is measured using the procedures disclosed in ASTM D737-96 Test Method for Air Permeability of Textile Fabrics, which is incorporated herein by references. The rate of air flow passing perpendicularly through a known area of fabric is adjusted to obtain a prescribed air pressure differential between the two fabric surfaces. From this rate of air flow, the air permeability of the fabric is determined. The pressure differential used was 0.5 inch column of water.

Reinforcement fiber mats which are parallel to the direction of pultrusion typically have a permeability of at least about 180 ft$^3$/minute/ft$^2$. To obtain pultrusion speeds with 30% filler in the resin, permeability of 300-350 ft$^3$/minute/ft$^2$ is preferred. A permeability of about 300-350 ft$^3$/minute/ft$^2$ can be achieved by using a coarse mesh entangler-belt in the hydro-entangler, so that a smaller number of larger holes are created (in the range of about 50 holes per square inch) to maximize the capability of polyester resin flow through the mat. For some applications, reinforcing mats with a permeability above 350 ft$^3$/minute/ft$^2$ meets can be used.

The web 85 is directed under a vacuum system 87 that draws most of the water from the web 85. The substantially dried web 85 is then passed through a forced-air oven 89. The oven 89 is preferably operated at a temperature between the glass transition temperature of the lower melt and high melt staple fibers. The staple fibers preferably soften and bond, but do not flow sufficiently to reduce the permeability of the reinforcing mat 18.

In an alternate embodiment, the web 85 is passes between a pair of hot rolls 106 which act to further calender the reinforcing mat and also to melt and activate the polyester fibers to provide a bonding action. In one embodiment, the rolls 106 are smooth 12 inch diameter smooth rolls on a B.F. Perkins calender set at 120° C. with a minimum gap of 0.007 inches. The rolls 106 reduce the reinforcing mat thickness and fuse the polyester material into the reinforcing mat 18.

A binder or an equivalent powdered, solvent, thermal or aqueous based thermoplastic binder is optionally applied to the reinforcing mat 18 by dispenser 113. The web picks up this binder, and is then squeezed through the rubber drying rolls 115 set at 30 psi, at the given speed per the needling process. Various binder materials can be applied to the reinforcing mat 18 to increase stiffness, such as corn starch, polyvinyl acetate or similar binder material. In one embodiment, the binder material is a reactive modified latex binder applied to the top surface of the reinforcing mat by an applicator which fills the interstices between the layers of the mat.

Binder is applied at a concentration adequate to impart the desired stiffness to the reinforcing mat for pultrusion handling and processing. The dry-mat stiffness may be tailored for ease-of-processing. The reactive sites in the binder regulate the occurrence of cross-linking within the binder upon drying, which renders those sited useless for the purpose of enhancing the strength of the pultrusion. Although a 10% reactive solution of Franklin Duracet X080 binder has been found to be beneficial and therefore preferred for enhancement of production strength, the level of binder reactive activity may be varied to achieve particular processing strengths and product strengths desirable for particular products.

An adhesive binding material such as polyvinyl acetate in a water carrier and containing about 20% to about 60% solids, corn starch or other adhesive material can be used to assist in interconnecting the structure so that the entangled fibers are bonded to the fibers of the reinforcing layers and the fibers are bonded to each other. Generally, the binding agent is present in an amount in the range of 2% to 20% by weight (dry weight without water). However, the amount of binding agent is significantly reduced relative to conventional non-woven mats and thus the stiffness of the structure is very much reduced and therefore improved, allowing the reinforcing mat to bend to take up the complex shape of the part to be formed while restricting shear.

If the staple fibers and/or some of the reinforcing fibers have a thermoplastic content, the binder can be reduced or omitted. Instead, the fibers are heated to provide some amount of heat bonding to each other. In the arrangement shown in FIG. 9, some of the entangling fibers are of a high melting point so that they remain intact and thus act as entangling fibers, and some are of a lower melting point so that they act as bonding fibers. In some embodiments where the binder is not required for structural purposes, it may still be used to increase stiffness.

The reinforcing mat passes through drying oven 114 that uses 200° F. air forced through the thickness to dry the mat. A suitable drying oven is available from National Drying of Gary, N.C. Once dried, the finished reinforcing mat 18 is stored on roll 82. The reinforcing mat 18 can optionally be slit longitudinally to the desired width for pultrusion prior to storage on the roll 82.

The calendering, needling, and padding steps can be rearranged, processed multiple times, or omitted if the reinforcing layers are thermally bonded with a resin as explained in detail herein, depending on the desired permeability, stiffness, and thickness required for the mat, to optimize the pultrusion process, and the mechanical properties of the pultruded product. The reinforcing mat formation may also be carried out on-line with the pultrusion process so as to avoid the winding and supply steps although in general this is unlikely to be practical in many circumstances due to the different speeds of the processing lines.

The reinforcing mat 18 as described provides reinforcement which has sufficient structural strength in the longitudinal and shear directions to ensure that it will be transported through the pultrusion die without significant longitudinal deformation or skewing. This is attributable to the fact that the main bulk of the fibers are arranged in the transverse direction to provide the finished product with the required transverse strength. The number of fibers therefore necessary for a predetermined transverse strength is significantly reduced since the bulk of the fibers are arranged in the direction to maximize the strength provided by each fiber.

Reinforcing mats of varying weight per square yard may be fabricated in accordance with the present invention. Mats of 0.5-1.0 ounces per square yard are useful for structural pultrusions with wall thickness of about 0.038 inches to unusually-high-strength pultrusions that are 0.090" thick, although other sizes of reinforcing mat and pultrusions can be made using this technology. The internal integrity of the present reinforcing mat permit strips as small as 0.5 inches wide to be slit without causing the reinforcing layers to delaminate.

For example, if G-150 yarns are used as the reinforcement layer, then a pultrusion wall thickness of 0.031" or less is feasible while retaining the required capability of a structural part having longitudinal strengths of approximately 40,000 psi, and transverse strengths of approximately 20,000 psi. On the other hand, much thicker glass fibers may be used to make thicker pultrusions with unusual high-strength, due to the orderliness of the fiber orientation in the transverse direction.

In addition, multiple layers of the reinforcing mat are useful in the production of high-strength products, to achieve enhanced physical capability in the pultruded parts, by use of this technology. For example, if two or three layers of the mats are used in a regular structural pultrusion that is 0.25-inches thick, then the strength of the pultrusion can be increased in the transverse direction as much as 200-400%. The transverse stiffness of the thick pultrusion may also be adjusted by a factor of 200-400%, thereby enhancing the longitudinal capability of the pultrusion because the bucking strength of the composite pultruded profile is dramatically increased.

In addition, one side of a pultrusion may be provided with multiple reinforcing mat layers, or a thick reinforcing mat may be employed on the compression side of the pultrusion product, while the other side of the pultrusion may be provided with a single layer on the tensile side. In the case of a hollow or channel-profile pultrusion, the outside of the part may be provided with a single or thin mat, while the inside of the pultruded part is provided with thicker or multiple layers of the reinforcement mats.

The stacking sequence of the layers of the reinforcing mat may also be varied to achieve the different or enhanced capabilities. For example, in lieu of the sequence of layers of the preferred embodiment of reinforcing mat construction as illustrated in FIGS. 19 and 20, the permeable transport layer may be located against the outer face of the transverse glass reinforcing fibers, between the transverse reinforcing fibers and an adjacent transport layer, or between the oppositely inclined rovings.

Reinforcing Fibers

The reinforcing fibers and the longitudinal rovings are preferably compatible with the resin matrix. As used herein, the phrase "compatible" in the context of a thermosetting resin or matrix refers to fibers and other components of a pultrusion laminate or part are selected or treated so that they facilitate penetration and essentially complete wetting and impregnation of the fiber and component surfaces by the thermosetting resin or matrix material, provide desired physical properties of the cured or finished laminate or part, are chemically stable with the thermosetting resin or matrix material and are resistant to hydrolysis.

The primary reinforcing fiber and the longitudinal rovings used in pultrusion are typically glass fibers. The 90° reinforcing fibers are preferably a 900 yield E-glass fiber that has been treated with an organosilane composition to increase reinforcement-matrix interfacial strength, The +/−45° oriented reinforcing fibers and the 0° direction reinforcing fibers are preferably G150's (15000 yards per pound) with a thermoplastic polyester resin sheathing available from Engineered Yarns Incorporated of Fall River, Mass.

Glass reinforcing fibers can be replaced with carbon fibers to achieve higher stiffness, strength, or temperature capability. Graphite fibers may for example be Mitsubishi Pitch K13C2U, Hexcel PAN AS4, and Amoco PAN T300. Glass reinforcing fibers can also be replaced with aramid fibers for toughness or resilience, using for example Teijin Technora or Kevlar type aramid fibers, with Kevlar type 29 being useful and Kevlar type 49 being preferred. Polyester fibers may be substituted for glass fibers where extended elongation or toughness are requisite properties, or natural fibers (e.g. cotton, jute, hemp) for cost. Metal and ceramic fibers may also be used.

The reinforcing fibers may be enhanced to improve the capability of the mat, or to tailor the reinforcing mat to achieve improved performance, including changes in geometry, stacking, materials, surface treatments such as sizings, and binders. For example, the 0° reinforcing fibers and the +/−45° reinforcing fibers may be pre-coated with a thermoplastic synthetic resin comprising an amide, a polyester, or a similar sheath-like binder. When subjected to elevated temperature, the sheathing binder flows and thereby fuses the reinforcing fibers of all of the layers of the reinforcing mat together, thereby producing a windable pre-mat. In addition, acrylic, polyvinyl acetatec, or similar emulsions with crosslinkable sites may be deposited on the reinforcement fibers so that these fibers react in the pultrusion composite to enhance the mechanical properties of the reinforcing mat by reinforcement of the fiber/resin interface. Methods of making a coated reinforcing fiber are disclosed in U.S. Pat. No. 4,058,581 (Park), Enhancement of the glass fibers may be accomplished by addition of a surface treatment including an organosilane to the fiber surface to augment the strength and durability of the final pultruded product. The addition of a coupling agent such as an organosilanes has been found to increase the pultruded product physical properties, such as wet strength retention. For example, application of an organosilane to G75 glass fiber yarns used for the transport fibers results in a stronger and more durable pultruded product. When an organosilane coating is added to the reinforcing fibers, improved results were obtained when a cationic amino-functional silane. Tris (2-methoxyethoxyvinylsilane) and 3-methacrylopropyltrimethoxysilane are exemplary silanes.

The composition for treating preferably comprises a surface treatment containing one or more coupling agents selected from the group consisting of organo silane coupling agents, transition metal coupling agents, ammo-containing Werner coupling agents and mixtures thereof. These coupling agents typically have dual functionality. Each metal or silicon atom has attached to it one or more groups which can react with the glass fiber surface and/or the components of the treating composition. As used herein, the term "react" with respect to coupling agents refers to groups that are chemically attracted, but not necessarily chemically bonded, to the glass fiber surface and/or the components of the treating composition, for example by polar, wetting or solvation forces. Examples of suitable compatibilizing or functional groups include epoxy, glycidoxy, mercapto, cyano, allyl, alkyl, urethano, halo, isocyanato, ureido, imidazolmyl, vinyl, acrylato, methacrylato, amino or polyamino groups.

Functional organo silane coupling agents are preferred for use in the present invention. Examples of suitable functional organo silane coupling agents include A-187 gamma-glycidoxypropyltrimethoxysilane, A-174 gamma-methacryloxypropyltrimethoxysilane and A-1100 gamma-aminopropyltriethoxysilane silane coupling agents, each of which are commercially available from OSi Specialties, Inc. of Tarrytown, N.Y. The organo silane coupling agent can be at least partially hydrolyzed with water prior to application to the glass fibers, preferably at about a 1:3 stoichiometric ratio or, if desired, applied in unhydrolyzed form.

Suitable transition metal coupling agents include titanium, zirconium and chromium coupling agents. The amount of coupling agent can be 1 to about 10 weight percent, of the composition for treating on a total solids basis.

Crosslinking materials, such as the aminoplasts discussed above, can also be included in the composition for treating. Non-limiting examples of suitable crosslinkers include meiamine formaldehyde, blocked isocyanates such as BAYBOND XW 116 or XP 7055, epoxy crosslinkers such as WITCOBOND XW by Witco Corp., and polyesters such as BAYBOND XP-7044 or 7056. The BAYBOND products are commercially available from Bayer of Pittsburgh, Pa. The amount of crosslinker can be about 1 to about 25 weight percent of the composition for treating on a total solids basis.

The composition for treating can include one or more emulsifying agents for emulsifying components of the composition for treating. Non-limiting examples of suitable emulsifying agents or surfactants include polyoxyalkylene block copolymers, ethoxylated alkyl phenols, polyoxyethylene octylphenyl glycol ethers, ethylene oxide derivatives of sorbitol esters and polyoxyethylated vegetable oils. Generally, the amount of emulsifying agent can be about 1 to about 20 weight percent of the composition for treating on a total solids basis.

The composition for treating can also include one or more aqueous dispersible or soluble plasticizers to improve flexibility. Examples of suitable non-aqueous-based plasticizers which are aqueous dispersible plasticizers include phthalates, such as di-n-butyl phthalate; trimellitates, such as trioctyl trimellitate; and adipates, such as dioctyl adipate. An example of an aqueous soluble plasticizer is CARBOWAX 400, a polyethylene glycol which is commercially available from Union Carbide of Danbury, Conn. The amount of plasticizer is more preferably less than about 5 weight percent of the composition for treating on a total solids basis.

Fungicides, bactericides and anti-foaming materials and organic and/or inorganic acids or bases in an amount sufficient to provide the aqueous composition for treating with a pH of about 2 to about 10 can also be included in the composition for treating. Water (preferably deionized) is included in the composition for treating in an amount sufficient to facilitate application of a generally uniform coating upon the strand. The weight percentage of solids of the composition for treating generally can be about 5 to about 20 weight percent.

Staple Fibers and/or Cut Fibers

Staple and/or cut fibers for making the permeable transport layer include fibers from polymers such as randomly oriented, cut-staple polyester fibers. The staple fibers can be loosely associated or arranged in a sheet or batting structure. The hydro-entangling jets grasp the staple and/or cut fibers and carry parts of the fibers into and through the reinforcing fiber layers, thus effecting entanglement and attachment of the underlying reinforcing fiber layers. The staple fibers preferably have a relatively low resistance to bending so that fibers may be moved downwardly by hydro-entanglement, by mechanical structure such as barbed needles, and the like.

Suitable staple fibers are polyester, although glass fibers of reduced denier meeting the requisite flexibility requirements may be also used as the staple fibers. The polyester material making up permeable transport layer comprises a batting of a blend of about 50%-70% Wellman 1.5 denier×1.5" polyester staple fiber, and about 30%-50% Kosa 1.5 denier by 1.5" long bi-component fiber, crimped and baled. The Kosa fiber gives the batting web a heat-fusible component, while the Wellman fiber enhances the consistency of the polyester batting and decreases shrink of the web during heat-fusing. After the blend is mixed, an opener filamentizes the fibers. The polyester batting in one embodiment has a density of about 60 grams/m$^2$ to about 300 grams/m$^2$ and in another embodiment about 90 grams/m$^2$ to about 150 grams/m$^2$. As used herein, "denier" refers to the mass of a fiber divided by its length.

The polyester staple fibers can be replaced with polyethylene batting, such as Honeywell Spectra 1000 or Honeywell Spectra 2000 fiber, or with a high strength polyethylene fiber such as Dyneema SK60 of Toyobo Company. A poly amide (nylon) batting may also be used. Furthermore, a textured, bi-component or crimped thermoplastic or reactive thermoset staple fiber, powder, or slurry; or combinations of the above fibers, powders, or slurries such as Kosa K90 and Wellman polyester staple fibers in water or preferably FIT and Wellman polyester staple fibers in water as used in paper making processes may be employed.

Blends of these staple fibers, powders, and slurries may also be used to achieve desired levels of stiffness and fusability (high-shrink fibers make the heat-fusion step more dynamic by causing melting kinetics to focus on the cross-over-points of the reinforcement fibers). A blend of low-melt-flow index and high-strength (high-melt-index) staple fibers achieve a distribution of reinforcing mat strengths, where the combination of melting kinetics (low-melt-index), and staple-fiber strength (high-melt-index) was varied to provide increased reinforcing mat integrity (longitudinal strength and resistance to melting at the pultrusion die entrance and within the pultrusion die).

The filament diameter size, in a range of about 9 to 25 microns, and the effective bundle diameter size, in a range of about in a range of about 0.010-inches to about 0.10-inch, can be adjusted to achieve various dimensions of pultrusion mat. The reinforcement layer can be made very thin, by the use of G150 yarns, or smaller. The strength of the mat, and corresponding pultrusion, can be increased, but the distribution of holes (for pultrusion resin wetting) might be lessened, depending on the evenness of the distribution of the G150 yarns. The reinforcement reinforcing fibers may also be increased in size to 110 yield glass fibers resulting in a bulkier reinforcing mat of lower cost.

Circular-Bending Stiffness

The reinforcement mats of the present invention have sufficient stiffness to be pulled without wrinkling and to maintain tracking (parallelism) to minimize distortion during processing, yet retain sufficient suppleness to allow the reinforcing mat to conform to the shape of the perimeter of the pultruded part.

The stiffness of the reinforcing mat is measured according to the procedure of ASTM D4032-94 Standard Test Method for Stiffness of Fabric by the Circular Bend Procedure. ASTM D4032 evaluates the maximum force required to push the fabric through an orifice in a platform. The maximum force is an indication of the fabric stiffness or resistance to bending.

The reinforcing mat preferably has a circular-bending stiffness within the range of about 4 Newtons (1 kilogram-meter/second$^2$) to about 15 Newtons. A reinforcing mat having a value of less than about 4 Newtons generally does not track well in the pre-former ahead of the pultrusion die for a complex part. A reinforcing mat over about 15 Newtons circular-bending stiffness has been found to be so stiff that it may be difficult to shape in the pre-former. A circular-bending stiffness of over about 15 Newtons also results in a preformed reinforcing mat that has undesirable wrinkles, or spans depressions, because the stiff reinforcing mat cannot follow the pre-form shaper. The stiffness of the reinforcing mat can be readily adjusted by the concentration and type of the binder used.

Mat Thickness

The mat thickness is measured by a tight squeeze of a digital calipers from Mitutoyo Corporation. Generally three readings were taken, at three different spots, and the average was recorded.

Mat Tensile Strength

The reinforcing mat preferably has a tensile strength in the 90° or transverse direction of about 200 lbs./inch as measured per ASTM D76-99. The reinforcing mat has a tensile strength in the 0° or pull direction of at least 3 lbs./inch as measured per ASTM D76-99, and more preferably at least 6 lbs./inch.

Measurements were taken on samples about 3 inches wide×6 inches long (either longitudinal or transverse) prepared by marking off the area and hand shearing. The samples were each pulled at a rate of about 0.2 in/minute until failure. Load and elongation were recorded. The average of four samples was recorded.

EXAMPLE 1

Thermally Bonded Reinforcing Mat

A reinforcing mat, in a resin matrix, that provides high transverse strength on the exterior or interior surface of a pultruded part, such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 020 direction. These longitudinal fibers are mostly 675-yield (about 675 yards per pound) glass reinforcing fibers.

The reinforcing mat is a multi-layered structure, with the longitudinal direction (e.g. the pull direction) designated as the 0°. A first layer includes a plurality of about 1800-yield glass reinforcing fibers in the transverse or 90° direction in the plane of the reinforcing mat set at about 10 courses per inch. A second layer includes of a plurality of an amide, polyester or reactive sheathed fiber glass bundles spaced about 4 per inch in about the +/−45° directions in the plane of the reinforcing mat thermally bonded to the transverse glass fibers. A third layer includes of a plurality of an amide, polyester or reactive sheathed fiber glass bundles spaced about 4 threads per inch in about the 0° direction in the plane of the reinforcing mat thermally bonded to the transverse glass fibers. A fourth layer includes a plurality of polyester fibers that have at least portions thereof which extend in the thickness direction through the third, second and/or first layers to effect a connection therebetween, with a pre-entangled weight of about 32 grams per square meter.

In addition, the reinforcing mat includes holes primarily between the transverse 1800-yield reinforcing fibers, like sieve-holes in the through-thickness direction, with the holes numbering about eighty per square-inch in a generally rectangular grid pattern. A polyvinyl acetate-based binder adheres the multiple layers and/or the interstices within a given layer. The entire reinforcing mat thickness (slightly compressed during thickness measurement) is approximately 0.010-inches, Further, the reinforcing mat includes a back-side with alternately-spaced 0° fibers as a third layer of a plurality of an amide, polyester or reactive sheathed glass fiber bundles spaced about 4 per inch in about the 0° direction in the plane of the mat, thermally bonded to the transverse glass fibers.

EXAMPLE 2

Polyester Stitched Reinforcing Mat

A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction, These longitudinal fibers are mostly 675-yield (about 675 yards per pound) glass reinforcing fibers.

The reinforcing mat is a multi-layered structure, with the longitudinal direction (e.g. the pull direction) designated as the 0°. A first layer includes a plurality of about 1800-yield glass fibers reinforcing fibers substantially in the transverse or 90° direction in the plane of the mat, set at about 10 courses per inch. A second layer includes a plurality of about 6-denier polyester thread spaced at about 6 threads per inch in the +45° directions in the plane of the mat is stitched to the transverse glass fibers. A third layer includes a plurality of about a 6-denier polyester thread spaced about 6 per inch in about the 0° direction in the plane of the reinforcing mat stitched to the transverse glass fibers. A fourth layer includes of a plurality of about 6-denier fibers that have at least portions thereof that extend in the thickness direction through the third, second and/or first layers to effect a connection therebetween with a pre-entangled weight of about 32 grams per square meter.

In addition, the reinforcing mat includes holes primarily between the transverse 1800-yield reinforcing fiber with about eighty per square-inch in a rectangular grid pattern. A polyvinyl acetate-based binder adheres the multiple layers and/or the interstices within a given layer. The entire reinforcing mat thickness (slightly compressed during thickness measurement) is about 0.010-inches.

The back-side of the reinforcing mat includes alternately-spaced 0° fibers as a third layer of a plurality of about a 6-denier polyester thread spaced about 6 threads per inch in about the 0° direction in the plane of the reinforcing mat and stitched to the transverse glass fibers.

EXAMPLE 3

Glass Fiber Stitched Reinforcing Mat

A reinforcing mat, in a resin matrix, that provides high transverse strength on the exterior or interior surface of a pultruded part, such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction. These longitudinal fibers are mostly 675-yield (about 675 yards per pound) glass reinforcing fibers.

The reinforcing mat is a multi-layered, structure, with the longitudinal direction (e.g. the pull direction) designated as the 0°. A first layer includes a plurality of about 1800-yield fiberglass fibers reinforcing fibers substantially in the transverse or 90° direction in the plane of the reinforcing mat set at about 10 courses per inch. A second layer includes a plurality of glass fiber bundles spaced, about 4 per inch in about the +45° directions in the plane of the mat, stitched to the transverse fiberglass. A third layer includes of a plurality of about a 6-denier polyester thread spaced at about 4 threads per inch in the 0° direction in the plane of the reinforcing mat and stitched to the transverse glass fibers. A fourth layer includes a plurality of polyester fibers that have at least portions thereof that extend in the thickness direction through the third, second and/or first layer to effect a connection therebetween with a pre-entangled weight of about 32 grams per square meter.

The reinforcing mat also includes holes primarily between the transverse 1800-yield reinforcing fiber numbering about eighty per square-inch in a rectangular grid pattern. A polyvinyl acetate-based binder adheres the multiple layers and/or the interstices within a given layer. The entire reinforcing mat thickness (slightly compressed during thickness measurement) is about 0.010-inches. The reinforcing mat also includes a back-side with alternately-spaced 0° fibers as a third layer of a plurality of a fiberglass bundles spaced about 4 threads per inch in the 0° direction in the plane of the reinforcing mat and stitched to the transverse fiberglass.

EXAMPLE 4

Heat-Fused Polyester Stitched Reinforcing Mat

A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction. These longitudinal fibers are mostly 250-yield (about 250 yards per pound) glass reinforcing yarn.

The reinforcing mat is a multi-layered structure, with the longitudinal direction (e.g. the pull direction) designated as the 0°. The first layer includes a plurality of about 1800-yield fiberglass fibers reinforcing fibers substantially in the transverse or 90° direction in the plane of the reinforcing mat set at about 8 courses per inch. A second layer includes a plurality of about G150 glass reinforced yarn spaced about 4 threads per inch in about the +/−45° directions in the plane of the reinforcing mat adjacent to the transverse fiberglass. A third layer includes a plurality of about a 150-denier polyester thread spaced about 5 threads per inch in the 0° direction in the plane of the reinforcing mat and stitched through all the layers. The bobbin thread was G150 glass reinforced yarn. The fourth layer includes a plurality of polyester staple fibers that have at least portions thereof that extend in the thickness direction through the third, second and/or first layer to effect a connection therebetween with a pre-entangled weight of about 60 grams per square meter. The polyester staple fibers are heat-fused at a temperature of about 350° to the glass reinforced yarns to act as an interlaminae-connector to the continuous fiber layers.

The reinforcing mat also includes holes primarily between the transverse 1800-yield reinforcing fiber numbering about fifty per square-inch in a rectangular grid pattern. A reactive modified latex binder adheres the interstices between the layers. The entire reinforcing mat thickness (compressed during thickness measurement) is about 0.010".

EXAMPLE 5

Heat-Fused Smooth-Surface Polyester Stitched Reinforcing Mat

A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction. These longitudinal fibers are mostly 250-yield (about 250 yards per pound) glass reinforcing yarn.

The reinforcing mat is a multi-layered structure, with the longitudinal direction (e.g. the pull direction) designated as the 0°. A first layer includes a plurality of about 1800-yield glass reinforcing fibers substantially in the transverse or 90° direction in the plane of the reinforcing mat set at about 8 courses per inch. A second layer includes a plurality of about G150 glass reinforced yarn spaced about 4 courses per inch in the +/−45° directions in the plane of the reinforcing mat adjacent to the transverse glass fibers. A third layer includes of a plurality of a about 150-denier polyester thread spaced about 5 per inch in the 0° direction in the plane of the reinforcing mat and stitched through all the layers mentioned above. The bobbin thread was G150 glass reinforced yarn. A fourth layer includes of a plurality of polyester staple fibers that have at least portions thereof which extend in the thickness direction through the third, second and/or first layer to effect a connection therebetween with a pre-entangled weight of about 120 grams per square meter. The polyester staple fibers are heat-fused at a temperature of about 350° to the glass reinforced yarns to act as an interlaminae-connector to the continuous fiber layers.

The reinforcing mat includes holes primarily between the transverse 1800-yield reinforcing fiber numbering fifty holes per square-inch in a rectangular grid pattern. A reactive modified latex binder adheres the interstices between the layers. The entire reinforcing mat thickness (compressed during thickness measurement) is about 0.010".

EXAMPLE 6

Heat-Fused Stitchless Reinforcing Mat

A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction. These longitudinal fibers are mostly 250-yield (about 250 yards per pound) glass reinforcing yarn.

The reinforcing mat is a multi-layered structure, with the longitudinal direction (e.g. the pull direction) designated as the 0°. A first layer includes a plurality of 1800-yield fiberglass fibers reinforcing fibers substantially in the transverse or 90° direction in the plane of the reinforcing mat set at about 8 courses per inch. A second layer includes a plurality of G150 fiberglass yarn spaced about 4 courses per inch in the +/−45° directions in the plane of the reinforcing mat adjacent to the transverse glass fibers. A third layer includes a plurality of polyester staple fibers that have at least portions thereof which extend in the thickness direction through the third, second and/or first layer to effect a connection therebetween with a pre-entangled weight of about 120 grams per square meter. The polyester staple fibers are heat-fused at a temperature of about 350° to the fiberglass yarns to act as an inter laminae-connector to the continuous fiber layers.

The reinforcing mat also includes holes primarily between the transverse 1800-yield reinforcing fiber numbering about fifty per square-inch in a rectangular grid pattern. A reactive modified latex binder adheres the interstices between the layers. The entire reinforcing mat thickness (compressed during thickness measurement) is about 0.010".

EXAMPLE 7

Heat-Fused Stitchless Reinforcing Mat, Without 45° Reinforcing Fibers

A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction. These longitudinal fibers are mostly 250-yield (about 250 yards per pound) glass reinforcing yarn.

The reinforcing mat is a multi-layered structure, with the longitudinal direction (e.g. the pull direction) designated as the 0°. A first layer includes a plurality of about 1800-yield fiberglass fibers reinforcing fibers substantially in the transverse or 90° direction in the plane of the reinforcing mat set at about 8 courses per inch. A second layer includes a plurality of polyester staple fibers that have at least portions thereof that extend in the thickness direction through the third, second and/or first layer to effect a connection therebetween, with a pre-entangled weight of about 100-200 grams per square meter. The polyester staple fibers are heat-fused at a temperature of about 350° to the glass reinforced yarns to act as an interlaminae-connector to the continuous fiber layers.

The reinforcing mat also includes holes primarily between the transverse 1800-yield reinforcing fiber numbering about fifty per square-inch in a rectangular grid pattern. A reactive modified latex binder adheres the interstices between the layers. The entire reinforcing mat thickness (compressed during thickness measurement) is about 0.010".

EXAMPLE 8

Heat-Fused Polyester Stitched Reinforcing Mat Using Silane-Treated Yarn

A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction. These longitudinal fibers are mostly 250-yield (about 250 yards per pound) glass reinforcing yarn.

The reinforcing mat is a multi-layered structure, with the longitudinal direction (e.g. the pull direction) designated as the 0°. A first layer includes a plurality of G37-yield glass reinforced yarns treated with organosilanes. The yarns of the first layer are substantially in the transverse or 90° direction in the plane of the reinforcing mat set at about 8 courses per inch. A second layer includes a plurality of G150 fiberglass yarn spaced about 4 courses per inch in the +/−45-degree directions in the plane of the reinforcing mat adjacent to the transverse glass reinforced yarns of the first layer. A third layer includes a plurality of about a 100-denier polyester thread spaced about 5 threads per inch in the 0° direction in the plane of the reinforcing mat and stitched through all the layers mentioned above. The bobbin thread was a G150 glass reinforced yarn. A fourth layer includes a plurality of polyester staple fibers that have at least portions thereof which extend in the thickness direction through the third, second and/or first layer to effect a connection there-between with a pre-entangled weight of about 60 grams per square meter. The polyester staple fibers are heat-fused at a temperature of about 350° to the glass reinforced yarns to act as an interlaminae-connector to the continuous fiber layers, The reinforcing mat also includes holes primarily between the transverse 1800-yield reinforcing fiber numbering about fifty per square-inch in a rectangular grid pattern. A reactive modified latex binder adheres the interstices between the layers. The entire reinforcing mat thickness (compressed during thickness measurement) is about 0.010".

EXAMPLE 9

Heat-Fused Polyester Stitched Reinforcing Mat with Metallic 45° Reinforcing Fibers A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in the 0° direction. These longitudinal fibers are mostly 250-yield (about 250 yards per pound) glass reinforcing yarn.

The reinforcing mat is a multi-layered structure, with the longitudinal direction (e.g. the pull direction) designated as the 0°. A first layer includes a plurality of 1800-yield glass reinforced fibers substantially in the transverse or 90° direction in the plane of the reinforcing mat set at about 8 courses per inch. A second layer includes a plurality of about 0.008" diameter aluminum wire spaced about 4 wires per inch in the +/−45° directions in the plane of the reinforcing mat adjacent to the transverse fibers. A third layer includes a plurality of about a 100-denier polyester thread spaced about 5 threads per inch in the 0° direction in the plane of the reinforcing mat and stitched through all the layers mentioned above using a G150 glass reinforced yarn as the bobbin thread. A fourth layer includes a plurality of polyester staple fibers that have at least portions thereof which extend in the thickness direction through the third, second and/or first layer to effect a connection there-between, with a pre-entangled weight of about 60 grams per square meter. The polyester staple fibers are heat-fused at a temperature of about 350° to the fiberglass yarns to act as an interlaminae-connector to the continuous fiber layers.

The reinforcing mat also includes holes primarily between the transverse 1800-yield reinforcing fiber numbering about fifty per square-inch in a rectangular grid pattern. A reactive modified latex binder adheres the interstices between the layers. The entire reinforcing mat thickness (compressed during thickness measurement) is about 0.010".

EXAMPLE 10

Heat-Fused Polyester Stitched Reinforcing Mat without 45° Reinforcing Fibers

A reinforcing mat, in a resin matrix, that provides high transverse strength on the exterior or interior surface of a pultruded part such as a sash stile or rail, or a pultruded frame head, sill, or jamb, or other products outside the fenestration industry. The cross-section of the pultruded part is a matrix of thermosetting resin with longitudinal and other-reinforcing fibers in the interior of the parts profile thickness. A first mat layer accounts for about 0.010 inches of the thickness of the pultruded part, the longitudinal-reinforcing fiber area is about 0.030" thick, and the opposite mat layer is also about 0.010" thick. The longitudinal reinforcing fibers are oriented in die 0° direction. These longitudinal fibers are mostly 250-yield (about 250 yards per pound) glass reinforcing yarn.

The reinforcing mat is a multi-layered structure, with the longitudinal direction (e.g. the pull direction) designated as the 0°. A first layer includes a plurality of about 1800-yield glass reinforcing fibers substantially in the transverse or 90° direction in the plane of the reinforcing mat set at about 8 courses per inch. A second layer includes a plurality of about a 100-denier polyester thread spaced about 5 per inch in the 0° direction in the plane of the reinforcing mat and stitched through all the layers mentioned above using a G150 glass reinforced yarn as the bobbin thread. A third layer includes a plurality of polyester staple fibers that have at least portions thereof which extend in the thickness direction through the third, second and/or first layer to effect a connection there-between, with a pre-entangled weight of about 120 grams per square meter. The polyester staple fibers are heat-fused at a temperature of about 350° to the fiberglass yarns to act as an interlaminae-connector to the continuous fiber layers;

The reinforcing mat also includes holes primarily between the transverse 1800-yield reinforcing fiber numbering about fifty per square-inch in a rectangular grid pattern. A reactive modified latex binder adheres the interstices between the layers. The entire reinforcing mat thickness (compressed during thickness measurement) is about 0.010".

The complete disclosures of all patents, patent applications, and publications disclosed herein, including those cited in the Background of the Invention section, are incorporated herein by reference as if individually incorporated. Various modifications and alterations of this invention will become apparent to those skilled in the art without departing from the scope and spirit of this invention, and it should be understood that this invention is not. to be unduly limited to the illustrative embodiments set forth herein.

What is claimed is:

1. A reinforcing structure adapted for use in the manufacture of a pultruded part where the reinforcing structure is pulled through a pultrusion die in a continuous longitudinal pull direction during pultrusion, the reinforcing structure comprising:
    a permeable transport web of heat-fusible, staple fibers that comprise a plurality of first polymeric fibers having a first glass transition temperature and a plurality of second polymeric fibers having a second glass transition temperature; and
    a reinforcing mat attached to the permeable transport web, the reinforcing mat including:
        a plurality of first reinforcing fibers arranged in a generally planar, non-overlapping configuration transverse to the longitudinal pull direction, wherein each of the plurality of first reinforcing fibers has a cross-sectional profile; and
        a plurality of second reinforcing fibers arranged in a generally planar, non-overlapping configuration parallel to the longitudinal pull direction, wherein each of the plurality of second reinforcing fibers has a cross-sectional profile that is smaller than the cross-sectional profile of each of the plurality of first reinforcing fibers,
        wherein the reinforcing structure has a transverse tensile strength in a direction transverse to the longitudinal pull direction and a parallel tensile strength in a direction parallel to the longitudinal pull direction, and the transverse tensile strength is substantially greater than the parallel tensile strength.

2. The reinforcing structure of claim 1, wherein the tensile strength in the direction transverse to the longitudinal pull direction is about 200 lbs./inch as measured per ASTM D76-99.

3. The reinforcing structure of claim 2, wherein the tensile strength in the direction parallel to the longitudinal pull direction is at least 6 lbs./inch as measured per ASTM D76-99.

4. The reinforcing structure of claim 1, wherein a ratio of the transverse tensile strength to the parallel tensile strength ranges from about 200:3 to about 200:6.

5. The reinforcing structure of claim 4, wherein the reinforcing mat further comprises a plurality of third reinforcing fibers, the third reinforcing fibers arranged at an angle relative to the first reinforcing fibers.

6. The reinforcement structure of claim 4, wherein the staple fibers have a weight of from about 10 grams per square meter to about 1200 grams per square meter.

7. The reinforcement structure of claim 4, wherein at least one of the first polymeric fibers and second polymeric fibers are bi-component fibers.

8. The reinforcement structure of claim 7, wherein each component of the bi-component fibers has a different glass transition temperature.

9. The reinforcement structure of claim 4, wherein at least a portion of the staple fibers are randomly entangled with the reinforcing fibers of the reinforcement mat.

10. A reinforcing structure adapted for use in the manufacture of a pultruded part where the reinforcing structure is pulled through a pultrusion die in a continuous longitudinal pull direction during pultrusion, the reinforcing structure comprising:
    a plurality of first reinforcing fibers at an angle relative to the longitudinal pull direction during pultrusion, the first reinforcing fibers being in a generally planar, non-overlapping configuration, wherein each of the plurality of first reinforcing fibers has a cross-sectional profile;
    a plurality of second reinforcing fibers at an angle relative to the longitudinal pull direction during pultrusion that is different than the angle of the first reinforcing fibers, the second reinforcing fibers being in a generally planar, non-overlapping configuration, wherein each of the plurality of second reinforcing fibers has a cross-sectional profile that is smaller than the cross-sectional profile of each of the plurality of first reinforcing fibers; and
    a permeable transport web of staple fibers having a weight of about 10 grams per square meter to about 1200 grams per square meter attached to the first reinforcing fibers and the second reinforcing fibers to provide longitudinal strength, shear strength, and anti-skew properties sufficient to substantially maintain the relative orientation of the first and second reinforcing fibers when subjected to pulling forces encountered during pultrusion,
    the reinforcing structure having a transverse tensile strength in a direction transverse to the longitudinal pull direction and a parallel tensile strength in a direction parallel to the longitudinal pull direction, the transverse tensile strength being substantially greater than the parallel tensile strength.

11. The reinforcing structure of claim 10, wherein the first reinforcing fibers are arranged perpendicular to the longitudinal pull direction.

12. The reinforcing structure of claim 10, wherein the second reinforcing fibers are oriented parallel to the longitudinal pull direction.

13. The reinforcing structure of claim 10, wherein the first reinforcing fibers are attached to the transport web by staple fibers that are randomly entangled with the first reinforcing fibers.

14. The reinforcing structure of claim 10, wherein the permeable transport web comprises a plurality of first polymeric fibers having a first glass transition temperature and a plurality of second polymeric fibers having a second glass transition temperature.

15. The reinforcing structure of claim 10, wherein the second reinforcing fibers are attached to the transport web by staple fibers that are randomly entangled with the second reinforcing fibers.

16. The reinforcing structure of claim 10, wherein the plurality of first reinforcing fibers are present in an amount up to about 90% of a total volume of material of the reinforcing structure so that the transverse tensile is being substantially greater than the parallel tensile strength.

17. A reinforcing structure adapted for use in the manufacture of a pultruded part where the reinforcing structure is pulled through a pultrusion die in a continuous longitudinal pull direction during pultrusion, the reinforcing structure comprising:
    a first reinforcing layer comprising a plurality of first reinforcing fibers each having a cross-sectional profile and each arranged in a generally planar, non-overlapping configuration, the first reinforcing fibers attached to a permeable transport web of staple fibers to provide shear strength and anti-skew properties sufficient to substantially maintain the relative orientations of the first reinforcing fibers when subjected to pulling forces encountered during pultrusion;

a second reinforcing layer comprising a plurality of second reinforcing fibers each having a cross-sectional profile that is larger than the cross-sectional profile of the first reinforcing fibers, the second reinforcing fibers arranged in a generally planar, non-overlapping configuration, the second reinforcing fibers attached to a permeable transport web of staple fibers to provide shear strength and anti-skew properties sufficient to substantially maintain the relative orientations of the second reinforcing fibers when subjected to pulling forces encountered during pultrusion; and a plurality of longitudinal rovings positioned between the first and second reinforcing layers, wherein the reinforcing structure has a transverse tensile strength in a direction transverse to the longitudinal pull direction and a parallel tensile strength in a direction parallel to the longitudinal pull direction, and wherein the transverse tensile strength is substantially greater than the parallel tensile strength.

18. The reinforcing structure of claim 17, wherein the first reinforcing fibers are arranged generally parallel to the longitudinal pull direction.

19. The reinforcing structure of claim 17, wherein the second reinforcing fibers are arranged at an angle relative to the first reinforcing fibers.

20. The reinforcing structure of claim 17, wherein the second reinforcing fibers are arranged generally perpendicularly to the first reinforcing fibers.

21. The reinforcing structure of claim 17, wherein the first reinforcing fibers are attached to the transport web by staple fibers randomly entangled with the first reinforcing fibers.

22. The reinforcement structure of claim 17, wherein the staple fibers have a weight of from about 10 grams per square meter to about 1200 grams per square meter.

23. The reinforcing structure of claim 17, wherein the permeable transport web comprises a plurality of first polymeric fibers having a first glass transition temperature and a plurality of second polymeric fibers having a second glass transition temperature.

24. The reinforcing structure of claim 17, wherein the second reinforcing fibers are attached to the transport web by staple fibers randomly entangled with the second reinforcing fibers.

25. The reinforcing structure of claim 17, wherein the plurality of first reinforcing fibers are present in an amount within the range of about 40% to about 90% of a total volume of material of the reinforcing structure so that the transverse tensile is being substantially greater than the parallel tensile strength.

26. A method of preparing a reinforcing structure for use in the manufacture of a pultruded part, where the reinforcing structure is pulled through a pultrusion die in a continuous longitudinal direction during pultrusion, the method comprising:

arranging a plurality of first reinforcing fibers generally transverse to the longitudinal pull direction, wherein each of the plurality of first reinforcing fibers has a cross-sectional profile;

arranging a plurality of second reinforcing fibers generally parallel to the longitudinal pull direction wherein each of the plurality of second reinforcing fibers has a cross-sectional profile that is smaller than the cross-sectional profile of each of the plurality of first reinforcing fibers;

contacting the first reinforcing fibers with a permeable transport web of staple fibers that comprise a plurality of first polymeric fibers having a first glass transition temperature and a plurality of second polymeric fibers having a second glass transition temperature; and attaching the first reinforcing fibers to the transport web by randomly entangling at least a portion of the staple fibers with the first reinforcing fibers, wherein the reinforcing structure has a transverse tensile strength in a direction transverse to the longitudinal direction and a parallel tensile strength in a direction parallel to the longitudinal direction, and wherein the transverse tensile strength is substantially greater than the parallel tensile strength.

27. The method of claim 26, further comprising:
attaching the second reinforcing fibers to the transport web.

28. The method of claim 26, further comprising heating the transport web and the first reinforcing fibers to a temperature between the first glass transition temperature and the second glass transition temperature.

29. The method of claim 26, wherein the staple fibers have a weight of from about 10 grams per square meter to about 1200 grams per square meter.

30. The method of claim 26, wherein at least one of the first polymeric fibers and second polymeric fibers are bi-component fibers.

31. The method of claim 30, wherein each component of the bi-component fibers has a different glass transition temperature.

32. A method of preparing a reinforcing structure for use in the manufacture of a pultruded part, where the reinforcing structure is pulled through a pultrusion die in a continuous longitudinal direction during pultrusion, the method comprising:

arranging a plurality of first reinforcing fibers at an angle relative to the longitudinal pull direction during pultrusion, the first reinforcing fibers being in a generally planar, non-overlapping configuration and each of the plurality of first reinforcing fibers having a cross-sectional profile;

arranging a plurality of second reinforcing fibers at an angle different than the angle of the first reinforcing fibers, the second reinforcing fibers being in a generally planar, non-overlapping configuration, and each of the plurality of second reinforcing fibers having a cross-sectional profile that is smaller than the cross-sectional profile of each of the plurality of first reinforcing fibers; and contacting the first reinforcing fibers with a permeable transport web of staple fibers having a weight of about 10 grams per square meter to about 1200 grams per square meter; and attaching the first reinforcing fibers to the transport web by randomly entangling at least a portion of the staple fibers with the first reinforcing fibers, wherein the reinforcing structure has a transverse tensile strength in a direction transverse to the longitudinal direction and a parallel tensile strength in a direction parallel to the longitudinal direction, and wherein the transverse tensile strength is substantially greater than the parallel tensile strength.

33. The method of claim 32, wherein the second reinforcing fibers are attached to the transport web by staple fibers randomly entangled with the second reinforcing fibers.

34. The method of claim 32, wherein the permeable transport web comprises a plurality of first polymeric fibers having a first glass transition temperature and a plurality of second polymeric fibers having a second glass transition temperature.

35. The method of claim 34, wherein at least one of the first polymeric fibers and second polymeric fibers are bi-component fibers.

36. The method of claim 35, wherein each component of the bi-component fibers has a different glass transition temperature.

* * * * *